US011511474B1

(12) United States Patent
Schirmer

(10) Patent No.: US 11,511,474 B1
(45) Date of Patent: Nov. 29, 2022

(54) MODULAR DISK COEXTRUSION DIE WITH MELT CHANNELING DISK

(71) Applicant: Henry G. Schirmer, Spartanburg, SC (US)

(72) Inventor: Henry G. Schirmer, Spartanburg, SC (US)

(*) Notice: Subject to any disclaimer, the term of this patent is extended or adjusted under 35 U.S.C. 154(b) by 0 days.

(21) Appl. No.: 17/581,393

(22) Filed: Jan. 21, 2022

Related U.S. Application Data

(60) Provisional application No. 63/189,573, filed on May 17, 2021.

(51) Int. Cl.

| B29C 48/335 | (2019.01) |
| B29C 48/21  | (2019.01) |
| B29C 48/34  | (2019.01) |
| B29C 48/06  | (2019.01) |
| B29C 48/18  | (2019.01) |
| B29C 48/10  | (2019.01) |

(52) U.S. Cl.
CPC .............. *B29C 48/34* (2019.02); *B29C 48/06* (2019.02); *B29C 48/10* (2019.02); *B29C 48/185* (2019.02); *B29C 48/21* (2019.02); *B29C 48/3363* (2019.02)

(58) Field of Classification Search
None
See application file for complete search history.

(56) References Cited

U.S. PATENT DOCUMENTS

| 2,820,249 A | 1/1958 | Colombo |
| 3,308,508 A | 3/1967 | Schrenk |
| 3,321,803 A | 5/1967 | Corbett |
| 3,565,985 A | 2/1971 | Schrenk et al. |
| 3,756,758 A | 9/1973 | Prall |
| 3,759,647 A | 9/1973 | Schrenk et al. |
| 3,924,990 A | 12/1975 | Schrenk |

(Continued)

FOREIGN PATENT DOCUMENTS

| DE | 19927556 | 12/2000 |
| EP | 0471879 | 2/1992 |

(Continued)

OTHER PUBLICATIONS

Schirmer et al., "Nano-Layer Structural Advances In Shrink Films," SPE Polyolefins Conference, Houston, Texas, Feb. 2013, 13 pages.

(Continued)

*Primary Examiner* — Robert J Grun
(74) *Attorney, Agent, or Firm* — Maxwell J. Petersen; FisherBroyles, LLP

(57) ABSTRACT

A modular disk coextrusion die is formed of a plurality of cells stacked together. Each cell includes an arrangement of thin annular disks, including at least a first cap disk, a first distribution disk, a first transition disk and a first spreader disk. The modular disk coextrusion die includes at least one channel disk having at least one inlet opening and at least two outlet openings per inlet opening. The thin annular disks are configured so that a first of the outlet openings of the channel disk is in fluid communication with the first distribution disk in the first cell and a second of the outlet openings in the channel disk is in fluid communication with the first distribution disk in the second cell. The channel disk provides for a more efficient utilization of space at the inlet of the modular disk coextrusion die and enables the feeding of up to twenty melt streams.

22 Claims, 8 Drawing Sheets

(56) References Cited

U.S. PATENT DOCUMENTS

| | | |
|---|---|---|
| 3,980,744 A | 9/1976 | Cogswell |
| 4,125,585 A | 11/1978 | Rosenbaum |
| 4,167,383 A | 9/1979 | Murakami et al. |
| 4,208,175 A | 6/1980 | Rosenbaum |
| 4,249,875 A | 2/1981 | Hart et al. |
| 4,669,965 A | 6/1987 | Murakami |
| 4,715,803 A | 12/1987 | Koppa |
| 4,772,195 A | 9/1988 | Touchet |
| 4,798,526 A | 1/1989 | Briggs et al. |
| 4,832,589 A | 5/1989 | Gini et al. |
| 4,889,477 A | 12/1989 | Wortberg et al. |
| 5,035,596 A | 7/1991 | Pohl |
| 5,076,776 A | 12/1991 | Kamada et al. |
| 5,103,337 A | 4/1992 | Schrenk et al. |
| 5,110,530 A | 5/1992 | Havens |
| 5,292,472 A | 3/1994 | Tompkins |
| 5,516,472 A | 5/1996 | Laver |
| 5,518,036 A | 5/1996 | DeMasters et al. |
| 5,538,411 A | 7/1996 | Gates |
| 5,690,972 A | 11/1997 | Planeta et al. |
| 5,723,157 A | 3/1998 | Grutjen |
| 5,762,971 A | 6/1998 | Schirmer |
| 5,891,480 A | 4/1999 | Schmidt |
| 6,000,926 A | 12/1999 | Schirmer |
| 6,082,025 A | 7/2000 | Bonk |
| 6,383,589 B1 | 5/2002 | Akutagawa |
| 6,413,595 B1 | 7/2002 | Schirmer |
| 8,241,736 B2 | 8/2012 | Ramli et al. |
| 8,870,561 B2 | 10/2014 | Schirmer |
| 9,381,723 B2 | 7/2016 | Kumar et al. |
| 10,611,129 B2 | 4/2020 | Schirmer |
| 11,090,853 B2 | 8/2021 | Schirmer |
| 11,173,642 B1 | 11/2021 | Schirmer et al. |
| 11,220,035 B2 | 1/2022 | Schirmer |
| 2001/0000234 A1 | 4/2001 | Helms, Jr. et al. |
| 2001/0015513 A1 | 8/2001 | Schaftingen |
| 2005/0271761 A1 | 12/2005 | Ohki |
| 2007/0243276 A1 | 10/2007 | Carniero |
| 2008/0274349 A1 | 11/2008 | Giammatteo |
| 2009/0087654 A1 | 4/2009 | Ling |
| 2010/0072655 A1 | 3/2010 | Roberts et al. |
| 2010/0215879 A1 | 8/2010 | Dooley |
| 2010/0227136 A1 | 9/2010 | Ramli |
| 2011/0227922 A1 | 9/2011 | Rivett |
| 2011/0264057 A1 | 10/2011 | Eversull |
| 2013/0009336 A1 | 1/2013 | Ausen et al. |
| 2013/0243894 A1 | 9/2013 | Schirmer |
| 2014/0363600 A1 | 12/2014 | Dooley |
| 2018/0029338 A1 | 2/2018 | Schirmer |
| 2020/0391425 A1 | 12/2020 | Schirmer |
| 2020/0391427 A1 | 12/2020 | Schirmer |

FOREIGN PATENT DOCUMENTS

| | | |
|---|---|---|
| EP | 0626247 | 11/1994 |
| FR | 2625941 | 7/1989 |
| GB | 2161745 | 1/1986 |
| WO | 0076765 | 12/2000 |
| WO | 2011119323 | 9/2011 |
| WO | 2016086314 | 6/2016 |
| WO | 2017083633 | 5/2017 |

OTHER PUBLICATIONS

Schrenk et al., "Coextruding Multilayer Blown Film—Part 1," SPE Journal, vol. 29 pp. 38-42, Jun. 1973.

Schrenk et al., "Coextruding Multilayer Blown Film—Part 2," SPE Journal, vol. 29 pp. 43-47, Jul. 1973.

MODULAR DISK COEXTRUSION DIE WITH MELT CHANNELING DISK

RELATED APPLICATIONS

This patent application claims the benefit of U.S. Provisional Application 63/189,573, filed on May 17, 2021, the disclosure of which is incorporated herein by reference.

FIELD OF THE INVENTION

This present invention is directed to a modular disk coextrusion die having one or more melt channeling disks that provide coextruded blown films, especially nanolayer films, with better layer thickness control due to its space saving benefit, the melt channeling disk(s) increases the number of useful polymer inlet ports from about 12 to at least 20, thereby permitting improved layer versatility.

BACKGROUND OF THE INVENTION

Modular disk coextrusion dies are known for providing multilayer blown films having high numbers of layers. U.S. Pat. No. 5,762,971 and 6,000,926, both issued to Schirmer, disclose an original modular disk coextrusion die that includes a plurality of cells of thin annular disks stacked on top of each other. Each cell includes, in sequence, an end cap disk, a distribution disk, an internal cap disk and a spreader disk (referred to as a spacer disk in the patents). In FIG. 4 of each patent, seven cells are stacked on top of each other and another end cap disk is added to enable production of a seven-layer blown film using melt streams that are individually processed into film layers in each of the cells. The disks and cells are bolted together to make a single seven-layer die. Each of the cells produces one layer of the multilayer film.

The number of layers in the multilayer film is limited by the number of entry ports that can be formed in the first cap disk of the modular disk coextension die and the number of cells that are stacked together. In FIG. 4 of the foregoing patents, up to twenty-four entry openings are shown to fit around the first cap disk. By stacking twenty-four of the cells together (instead of the seven illustrated), a blown film having up to twenty-four layers can be produced using various combinations of the same or different polymer resins. In practice, the number of entry points is further limited by the fact that some of the entry openings (up to twelve of the twenty-four) are commonly used as bolt holes to bolt the thin annular disks together, thus further limiting the number of polymer streams and the number of layers to perhaps twelve.

U.S. Pat. No. 8,870,561 and U.S. Pat. No. 10,611,129, both issued to Schirmer, describe a layer sequence repeater module for a modular disk coextrusion die. In the layer sequence repeater module, at least one of the cells has been modified to replace the single spreader disk with an alternating sequence of spreader disks and repeater disks. The resulting cell is no longer limited to providing a single layer, but instead can provide many alternating layers of different polymer resins. These patents disclose coextruded films having up to twenty-five layers produced using a single cell and up to seventy-seven layers when three of the cells are stacked together.

U.S. Pat. Nos. 11,090,853 and 11,220,035, both to Schirmer, disclose a modular disk coextrusion die having an opposing disk arrangement that achieves improved balance of the melt and enables the production of multilayer nanolayer coextruded films having up to 300 or more layers using up to twelve melt inlet streams that enable the production of varying layer arrangements ranging from complex to relatively simple, in repeating sequences. The opposing disk arrangement that enables the production of nanolayer films having up to 300 or more layers, using symmetrically arranged cells of thin annular disks that produce two film layers per cell, with each cell being fed at opposing inlet locations that are 180 degrees apart from each other. The drawings of each publication illustrate 24-layer nanolayer structures formed using twelve of the cells stacked on top of each other and four extruders, each feeding a different polymer composition.

FIG. 5 of U.S. Pat. No. 11,090,853, which is reproduced herein as FIG. 1, schematically illustrates one arrangement of extruder inlets that can be used to feed the twelve polymer streams into a single inlet plate. Referring to FIG. 1, die plate 506 supports and feeds a modular disk coextrusion die 10 formed of a stack of thin annular disks, the first of which is an inlet feed disk 102, whereupon the coextrusion die 10 can form a multilayer blown film bubble 514 composed of thin nanolayers. The inlet feed disk 102 includes 24 openings 1A-1X. Twelve of the inlet openings 1A-1L are used to receive polymer melt streams, four of the inlet openings 1M-1P are used to receive bolt fasteners, and eight of the openings 1Q-1X are not used at all. Polymer from a first extruder 140 is split into three streams 142, 144 and 146, which enter the modular disk coextrusion die through inlets 1A, 1C and 1E. Polymer from a second extruder 150 is split into three streams 152, 154 and 156, which enter the modular disk coextrusion die through inlets 1B, 1D and 1F. Polymer from a third extruder 160 is split into three streams 162, 164 and 166, which enter the modular disk coextrusion die through inlets 1G, 1I and 1K. Polymer from a fourth extruder 170 is split into three streams 172, 174 and 176, which enter the modular disk coextrusion die through inlets 1H, 1J and 1L. The direction of extrusion may be upward or downward through the modular disk coextrusion die 10 to form an upward or downward oriented blown film bubble.

As shown in FIG. 1, there are potentially twenty polymer inlet openings around the circumference of the inlet disk. However, only twelve of the twenty are readily accessible due to the hindrance resulting from the surrounding extruders and related equipment. If one were able to readily access all twenty inlet openings, this would enable the production of more complex multilayer nanolayer films having greater numbers of layers in each repeating sequence, greater numbers of different, polymer compositions, and further improved layer uniformity and balance of the melt streams.

SUMMARY OF THE INVENTION

The present invention is directed to a modular disk coextrusion die that includes one or more channel disks, each of which can receive a polymer melt stream and distribute it to two, three, four, five or more polymer inlets in a modular disk coextrusion die. The channel disk can have two, three, four or more inlets, whereupon each inlet receives a separate polymer stream, splits it into two, three, four, five or more polymer streams, and distributes the streams via channel disk outlets to two, three, four, five or more polymer inlets feeding the remainder of the modular disk coextrusion die. Each outlet of the channel disk corresponds to and is in fluid communication with a corresponding inlet feeding the modular disk coextrusion die. Positioning the inlets to the channel disk at opposing and/or evenly spaced intervals helps balance the blown film bubble and facilitates a more even layer thickness, which is especially useful when producing nanolayer films. In effect, the channel disk eliminates the need to split the melt streams from the extruders prior to entering the modular disk coextrusion die as was explained above with respect to FIG. 1. Each inlet of the channel disk effectively provides two, three, four, five or more inlets to the remainder of the modular disk coextrusion die.

The channel disk can be positioned as the first (entry) disk in the modular disk coextrusion die arrangement. This can reduce the bulk of extruders and related equipment that would otherwise need to be positioned very near to the inlet plate of the modular disk coextrusion die as shown in FIG. 1, for instance. Referring to FIG. 1, use of a channel disk having four inlets, with each inlet splitting a corresponding polymer stream into five outlets, would eliminate the need for splitting the melt from each extruder into separate streams before entering the die while enabling the feeding of up to 20 polymer streams into the modular disk coextrusion die instead of twelve.

In alternative embodiments, the channel disk can be positioned elsewhere within the stack of thin annular disks in the modular disk coextrusion die, so that a splitting of one or more melt streams occurs within the die. In other embodiments, the modular disk coextrusion die can include two or more channel disks positioned at selected locations at the entrance to the die and/or elsewhere within the die to facilitate splitting of the melt streams at the selected locations.

With the foregoing in mind, one embodiment of the modular disk coextrusion die includes the following features:

A modular disk coextrusion die, including at least first and second cells, each cell including a plurality of thin annular disks arranged in a stacked configuration;

each of the first and second cells including a first cap disk having a plurality of openings disposed around a perimeter thereof, a first distribution disk, a first transition disk and a first spreader disk;

the modular disk coextrusion die further including a channel disk having at least one inlet opening, at least two outlet openings per inlet opening, and channels connecting the at least one inlet opening with the at least two outlet openings;

wherein the thin annular disks are configured so that a first of the outlet openings of the channel disk is in fluid communication with the first distribution disk in the first cell and a second of the outlet openings of the channel disk is in fluid communication with the first distribution disk in the second cell.

Another embodiment of the modular disk coextrusion die includes the following features:

A modular disk coextrusion die including at least first and second cells, each of the first and second cells including a plurality of thin annular disks arranged in a stacked configuration;

each of the first and second cells including a central routing disk having at least one flow opening, a first sub-cell on a first side of the central routing disk, and a second sub-cell on a second side of the central routing disk;

each first sub-cell including a first distribution disk, a first transition disk and a first spreader disk;

each second sub-cell including a second distribution disk, a second transition disk and a second spreader disk;

each of the first and second distribution disks including a distribution inlet opening, a plurality of outlet openings, and a plurality of channels connecting the distribution inlet opening with the plurality of outlet openings, wherein the distribution inlet opening in the first distribution disk is about 180 degrees opposed to the distribution inlet opening in the second distribution disk;

the modular disk coextrusion die further including a channel disk having at least one inlet opening, at least two outlet openings per inlet opening, and channels connecting the at least one inlet opening with the at least two outlet openings;

wherein the thin annular disks are configured so that the two outlet openings of the channel disk are in fluid communication with at least two of the distribution disks in the first and/or second cells.

Still another embodiment of the modular disk coextrusion doe includes the following features:

A modular disk coextrusion die, including at least ten cells, each cell including a plurality of thin annular disks arranged in a stacked configuration;

each of the at least ten cells including a first cap disk having a plurality of openings disposed around a perimeter thereof, a first distribution disk, a first transition disk and a first spreader disk;

the modular disk coextrusion die further including a channel disk having at least two inlet openings, at least five outlet openings per inlet opening, and channels connecting each of the at least one inlet openings with the at least five outlet openings per inlet opening;

wherein each the outlet openings in the channel disk are in fluid communication with at least an equal number of distribution disks in the cells.

The foregoing and other features and advantages will become further apparent from the following detailed description of the invention, read in conjunction with the accompanying drawings.

DETAILED DESCRIPTION OF THE INVENTION

Figure 2A:
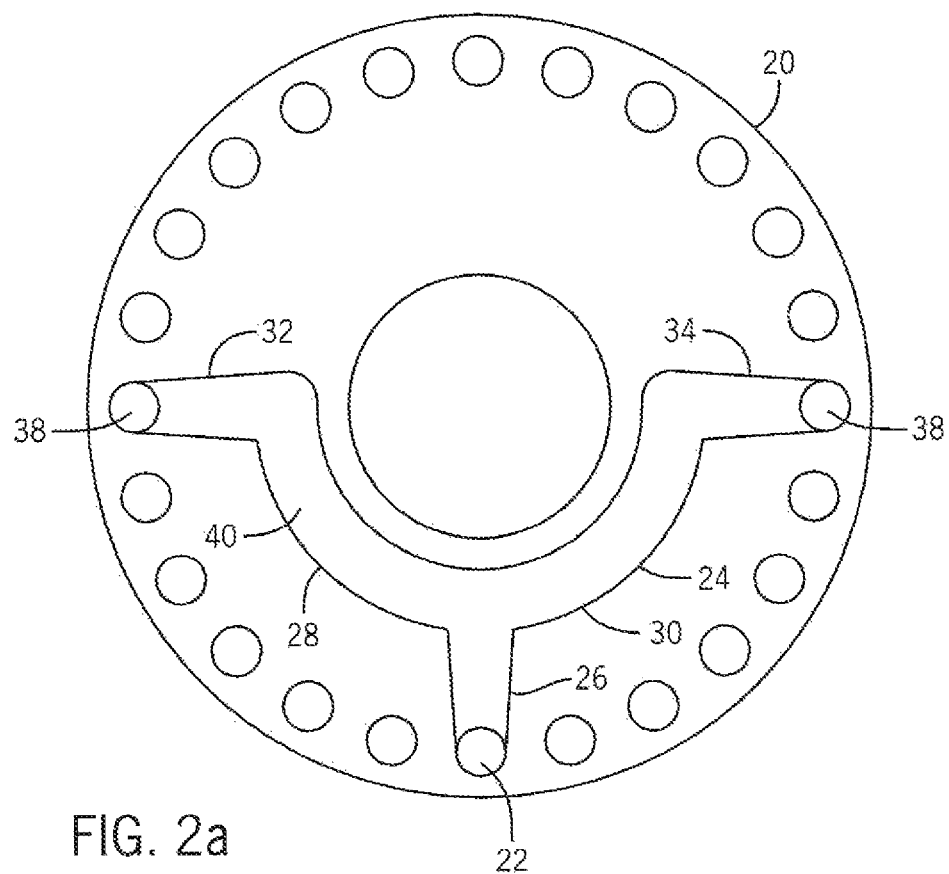
FIG. 2a is a top view of one embodiment of a channel disk that can be used in the inventive modular disk coextrusion die.
Figure 2B:
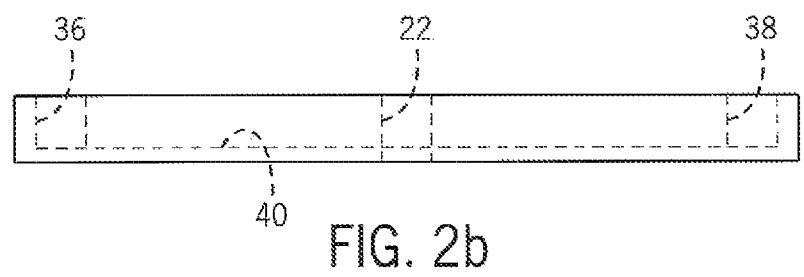
FIG. 2b is a front view of the channel disk of FIG. 2a, with the dotted lines showing selected internal elements.

FIGS. 2a and 2b illustrate one embodiment of a channel disk 20 that can be used in a modular disk coextrusion die. The channel disk 20 includes an inlet 22 that can receive a polymer melt stream either from an external extruder, if the channel disk 20 is positioned as a first (inlet) disk to a modular disk coextrusion die, or from another thin annular disk described below if the channel disk 20 is positioned within the modular disk coextrusion die. The inlet 22 can extend completely through the channel disk 20 as shown in FIG. 2b. The inlet 22 leads into a melt separator channel 24 including an inlet branch 26 leading into split channels 28 and 30, which in turn lead to corresponding exit channels 32 and 34, which in turn lead to outlets 36 and 38 on opposite ends of the channel disk 20. The melt separator channel can include a floor 40 if the channel disk 20 is used as an inlet disk to a modular disk coextrusion die, whereupon the floor 40 and the opposing surface of the next adjacent thin annular disk define a closed channel. If the channel disk is instead positioned as an interior disk between two other thin annular disks, then the channel disk many or may not include the floor 40, whereupon the nearest surfaces of the adjacent thin annular disks can close the melt separator channel 24.

Figure 5:
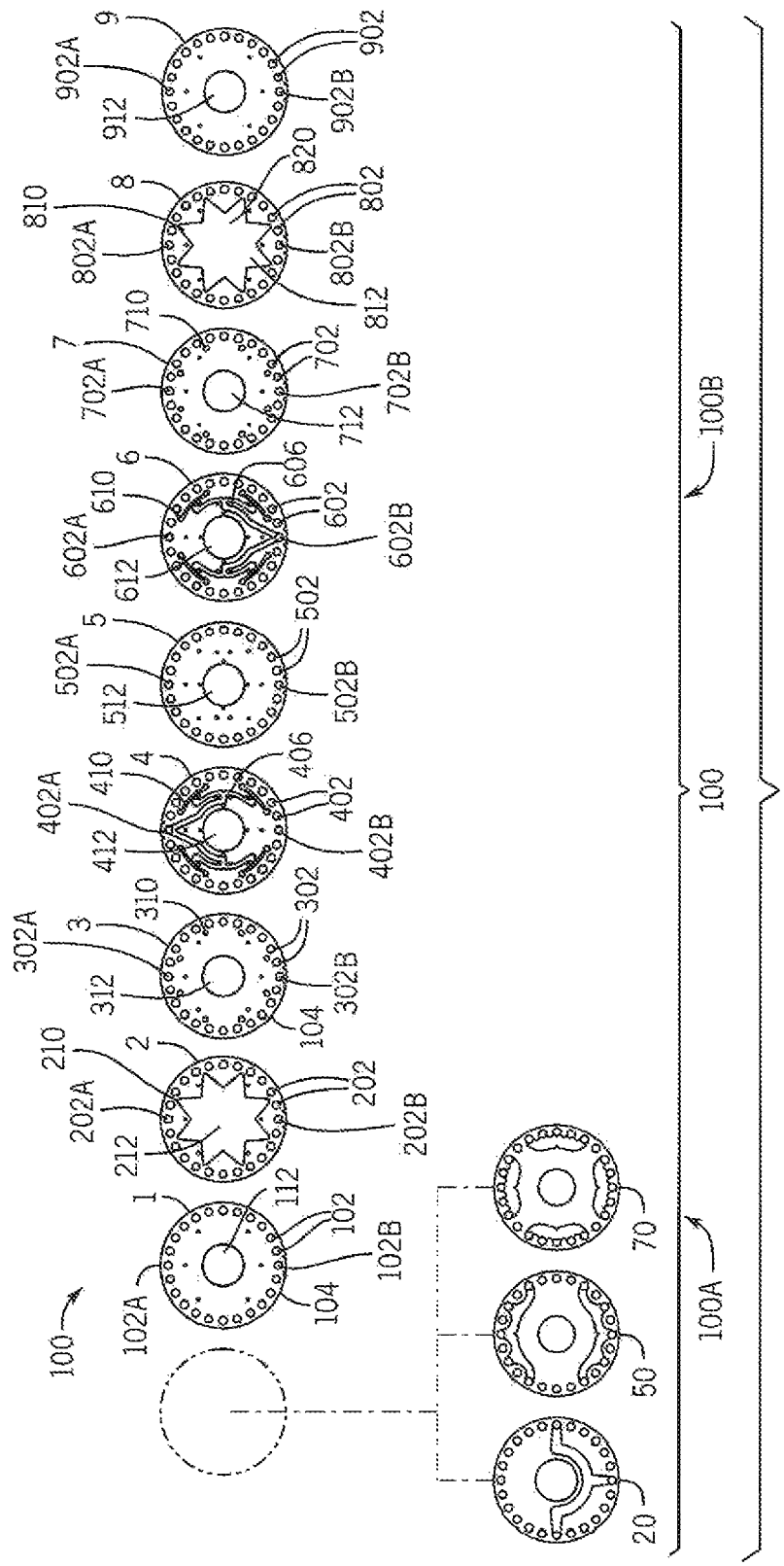
FIG. 5 schematically illustrates a layout of thin annular disks together forming a cell, into which any of the channel disks of FIGS. 2a, 3a and/or 4a can be inserted at the front entrance to a first cell or in between cells.

The channel disk 20 can take a single melt inlet stream from a single extruder and split it into two identical melt streams that exit at opposing ends of the channel disk 20. The channel disk 20 having opposing outlets 36 and 38 can be incorporated into a modular disk coextrusion die having an opposing disk arrangement, as described in the above-identified U.S. Patent Application Publications 20200391425 and 20200391427, both to Schirmer, the disclosures of which are incorporated herein by reference. The channel disk 20 is especially useful for a modular disk coextrusion die including at least first and second cells, one of which is schematically illustrated in exploded view in FIG. 5, wherein each cell includes a plurality of thin annular disks arranged in a stacked configuration. With reference to FIG. 5, each of the first and second cells 100 includes a central routing disk 5 having at least one flow opening, a first sub-cell 100A on a first side of the central routing disk, and a second sub-cell 100B on a second side of the central routing disk. Each first sub-cell 100A includes a first distribution disk 4, a first transition disk 3, and a first spreader disk 2. Each second sub-cell 100B includes a second distribution disk 6, a second transition disk 7 and a second spreader disk 6. Each of the first and second distribution disks includes a distribution inlet opening 402A, 602B; a plurality of outlet openings 410, 610; and a plurality of channels 406, 606 connecting the distribution inlet opening with the plurality of outlet openings. The distribution inlet opening 402A in the first distribution disk 4 is about 180 degrees opposed to the distribution inlet opening 602B in the second distribution disk 6. The channel disk 20 having at least one inlet opening 22, at least two outlet openings 36 and 38 per inlet opening, and melt channels 24 connecting the at least one inlet opening with the at least two outlet openings can be configured along with the thin annular disks so that the at least two outlet openings 36, 38 per inlet opening 22 of the channel disk 20 are in fluid communication with, and suitably aligned with the inlet openings 402A, 602B of at least two of the distribution disks 4, 6 in the first and/or second cells. In one embodiment, the at least two outlet openings 36, 38 per inlet opening 22 in the channel disk 20 are aligned and in fluid communication with the opposing first and second distribution disk inlet openings 402A, 602B in the first and second sub-cells 100A, 100B of the same (e.g., first or second) cell. In another embodiment, the at least two outlet openings per inlet opening in the channel disk are aligned and in fluid communication with distribution disk inlet openings in different (e.g., first and second) cells.

Referring again to FIG. 5, any of the channel disks 20, 50 or 70 (described further below), or any other channel disk can be positioned to precede the first cap disk 1 and thus feed a plurality of split melt streams into the first cap disk of the cell 100. Any of the channel disks can alternatively, or additionally, be placed in between adjacent cells 100 in order to split a melt stream into a plurality of streams elsewhere in the modular disk coextrusion die. In the opposing disk arrangement shown in FIG. 5, thin annular disks 1-9 of cell 100 are typically stacked face to face in the order 1-9 but are shown individually in plan view for purposes of illustration. Each cell 100 includes a first cap disk 1 that can receive one or more polymer streams from one of the channel disks described herein, or directly from an external source, or from an immediately preceding cell. Each cell 100 can also include a second cap disk 9. Because only one cap disk is needed between the adjacent cells, the second cap disk 9 of each cell 100 may serve as the first cap disk 1 of each subsequent cell 100, this eliminating the need for duplicate cap disks between adjacent cells.

The channel disk 20, 50 or 70 or any other channel disk can be placed immediately preceding the first cap disk 1 so as to distribute one or more initial melt streams between different (e.g., opposing) locations feeding into the first cell 100, or may be placed immediately preceding the first cap disk of a second or subsequent cell 100, so as to distribute one or more portions of initial melt stream(s) between different (e.g., opposing) locations feeding into a selected cell 100. Each of the thin annual disks 1-9 has twenty-four flow openings (102-902) arranged in an outer ring 104, and a central opening (112-912) that permits extrusion of the blown film bubble. The number of flow openings 102 may vary but is constrained by the available surface area on the disks and the fact some (typically four) of the openings 102-902 in each disk can be used as bolt holes to fasten the stack of thin annular disks together. The use of one or more channel disks enables up to twenty of the flow openings 102-902 to receive polymer melt streams originating from external sources (e.g., extruders) whereupon the four remaining openings 102-902 can be used as bolt holes. The flow openings in the respective thin annular disks 1-9 are aligned and may be selectively open or selectively blocked to control the flow of individual polymer streams from one disk to the next within a cell 100, and to additional cells 100 which may be stacked together to form a modular disk coextrusion die.

Through use of the melt channel disks, the cap disk 1 can therefore receive a plurality of melt streams through up to twenty of the flow openings 102. Some or all of the available flow openings 102 can be selectively utilized to receive any combination of melt streams composed of the same or different polymers. Cap disk 1 also includes a central annular opening 112 that ultimately forms and extrudes one layer of a blown film bubble, as explained further below.

Each of the cells 100 can be used to process the melt streams of the same or different polymers and form two layers of the blown film bubble. A first melt stream can be fed to opening 102A from a first outlet 36 of channel disk 20, which in turn receives polymer through its first inlet 22 from a first extruder. The first melt stream passes through flow opening 202A in spreader disk 2, flow opening 302A in transition disk 3, and into distribution inlet opening 402A in distribution disk 4, all of which are aligned and in fluid communication with each other. The corresponding aligned flow opening 502A in the central routing disk 5 can be blocked in order to channel the first melt stream completely into distribution disk 4 or can be left open in order to split the first melt stream between different cells as explained below. A second melt stream can be fed to opening 102B from a second outlet 38 of the channel disk 20 which feeds polymer originating from the first extruder, or from another outlet connected to another inlet (described further below) which receives polymer originating second extruder, whereupon it passes through flow opening 202B in spreader disk 2, flow opening 302B in transition disk 3, flow opening 402B in distribution disk 4, flow opening 502B in central routing disk 5, and into distribution inlet opening 602B in distribution disk 6, all of which are aligned and in fluid communication with each other. The corresponding flow opening 702B in transition disk 7 can be blocked in order to channel the second melt stream completely into distribution disk 6 or can be left open in order to split the second melt stream between different cells as explained below.

Disk 5 is referred to as the central routing disk because it directs the first melt stream completely into the first distribution disk 4 and directs the second melt stream completely into the second distribution disk 6. The central routing disk 5 has essentially the same configuration as the first cap disk 1 and the optional second cap disk 9, with twenty-four peripheral openings 502 aligned with corresponding openings in all the other disks, which may be selectively opened or closed (blocked) to direct the melt streams. The central routing disk 5 is centrally located between the first sub-cell (including distribution disk 4, transition disk 3 and spreader disk 2) that processes the first melt stream and the second sub-cell (including distribution disk 6, transition disk 7 and spreader disk 8) that processes the second melt stream.

In the embodiment shown in FIG. 5, the distribution disks 4 and 6 are oriented so that the distribution inlet opening 402A in disk 4 is 180 degrees opposed to the distribution inlet opening 602B in disk 6, and the distribution disks 4 and 6 appear as mirror opposites to each other. Distribution disk 4 includes distribution inlet opening 402A, feeding a plurality of connected channels and subchannels 406 which divide the first melt stream into eight smaller streams feeding eight outlet openings 410 that are evenly spaced around the distribution disk 4. Distribution disk 6 includes distribution inlet opening 602B, feeding a plurality of connected channels and subchannels 606 which divide the second melt stream into eight smaller streams feeding eight outlet openings 610 that are evenly spaced around the distribution disk 6.

The first melt stream exits the outlet openings 410 in distributing disk 4 and passes through aligned transition openings 310 in the transition disk 3, then to the similarly aligned flow ports 210 in spreader disk 2, which are in fluid communication with each other. The second melt stream exits the outlets 610 in distribution disk 6 and passes through aligned transition openings 710 in transition disk 7 and into the similarly aligned flow ports 810 in spreader disk 8, which are in fluid communication with each other. The transition disks 3 and 7 are adjacent to the corresponding distribution disks 4 and 6 and are configured like the cap disks 1 and 9 except for the addition of eight equally spaced transition openings 310 and 710 in the transition disks. The transition openings 310 and 710 are positioned to be fully aligned and in fluid communication with the eight outlet openings 410 and 610 in the corresponding distribution disks.

The spreader disks 2 and 8 are positioned adjacent to the corresponding transition disks 3 and 7 and serve the purpose of spreading each distributed melt stream into a flat plane that can then be blown into a layer of the blown film bubble. The spreader disks 2 and 8 include a plurality of flow ports 210 and 810, each connected and leading into a flat flow region 220 and 820. The illustrated spreader disk 2 includes eight of the flow ports 210, which are aligned and in fluid communication with the transition openings 310 in the transition disk 3 and the outlet openings 410 in the distribution disk 4. The illustrated spreader disk 8 includes eight of the flow ports 810, which are aligned and in fluid communication with the transition openings 710 in the transition disk 7 and the outlet openings 610 in the distribution disk 6.

During blown film coextrusion, an appropriate amount of pressurized air is injected through the central annular opening 112 in the first cap disk 1. The spreader disks 2 and 8 expose the processed (flattened) first and second melt streams to that air flow. The first flattened melt stream is thereby extruded, in tubular form, from the flow region 212 in spreader disk 2, through the central annular openings 312, 412, 512, 612, and 712 in disks 3, 4, 5, 6 and 7. The tubular first melt stream combines with the second melt stream in the spreader disk 8 and both melt streams are coextruded together, in the tubular form, through the central annular opening 912 in the second cap disk 9. Each cell 100 is thus capable of producing two layers of a multilayer blown film. By stacking multiple cells together and using very thin annular disks, selectively welded together as described below, blown films having 300 or more layers can be produced by stacking 150 or more cells together. The number of cells 100 stacked together in a modular disk coextrusion die 10 having at least one channel disk can be at least two, or at least three, or at least four, or at least five, or at least six, or at least seven, or at least eight, or at least ten, or at least twelve, or at least fifteen, or at least twenty-five, or at least 50, or at least 100, or at least 150 or more when blown films having 300 or more layers are desired.

Figure 3A:
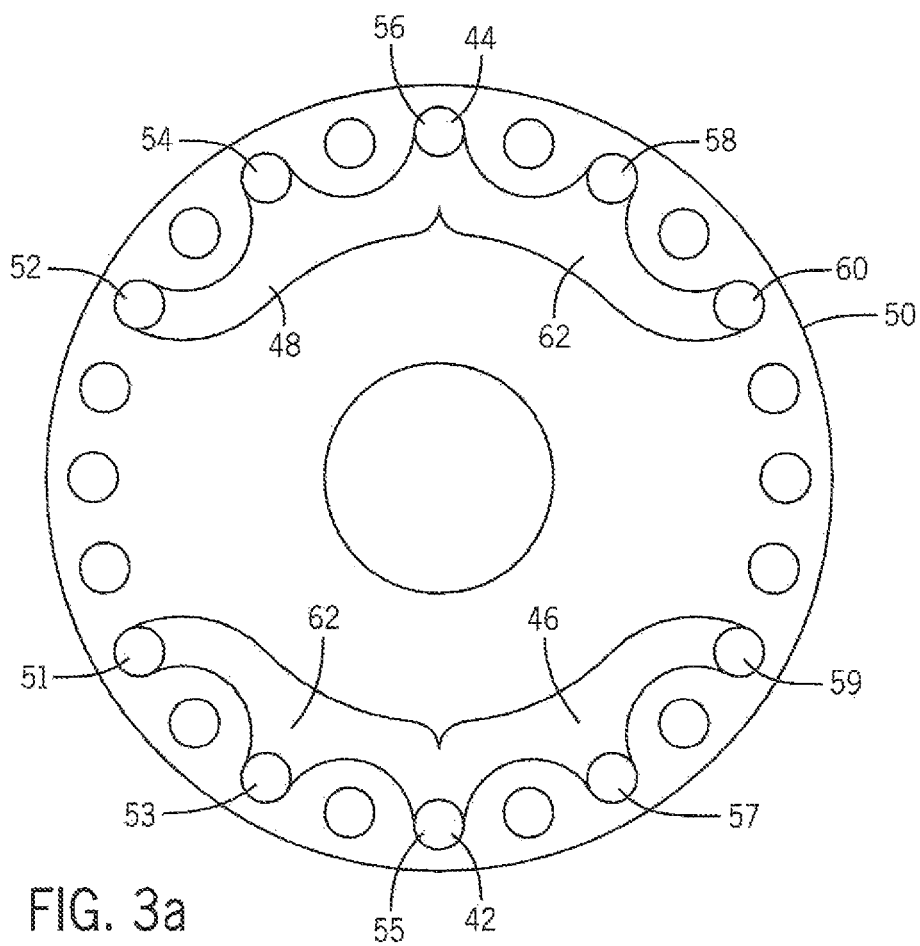
FIG. 3a is a top view of another embodiment of a channel disk that can be used in the modular disk coextrusion die.
Figure 3B:
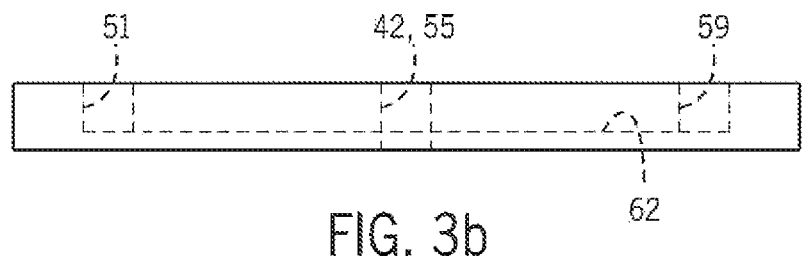
FIG. 3b is a front view of the channel disk of FIG. 3a, with the dotted lines showing selected internal elements.

FIGS. 3a and 3b illustrate another embodiment of a channel disk 50 that includes first and second inlets 42 and 44 on opposing sides of the channel disk 50. The first and second inlets 42 and 44 feed into respective melt separator channels 46 and 48, each of which separates a respective melt stream into five different streams. The first melt separator channel 46 leads to five outlets 51, 53, 55, 57 and 59. The second melt separator channel 48 leads to five outlets 52, 54, 56, 58 and 60. In one embodiment, the first inlet 42 can receive a first polymer stream from a first extruder and the second inlet 44 can receive a second polymer from a second extruder. In the embodiment shown, the first set of outlets 51, 53, 55, 57 and 59 and the second set of outlets 52, 54, 56, 58 and 60 are spaced apart in a manner that achieves maximum balance of the melt streams used to form the layers of the blown film coextrusion bubble. In order to accomplish this, the opening defining the first inlet 42 is a pass-through opening that also defines the outlet 55. The opening defining the second inlet 44 is a pass-through opening that also defines the outlet 56. This balancing can achieve optimal uniformity in layer thickness and optimal bubble stability, thereby facilitating the production of nanolayer films having very thin layers and large numbers of layers.

The melt separator channels 46 and 48 can include a floor 62 if the channel disk 50 is used as an inlet disk to a modular disk coextrusion die, whereupon the floor 62 and the opposing surface of the next adjacent thin annular disk define closed channels. If the channel disk 50 is instead positioned as an interior disk between two other thin annular disks, then the channel disk 50 may or may not include the floor 62, whereupon the nearest surfaces of the adjacent thin annular disks can close the melt separator channels 46 and 48.

Figure 4A:
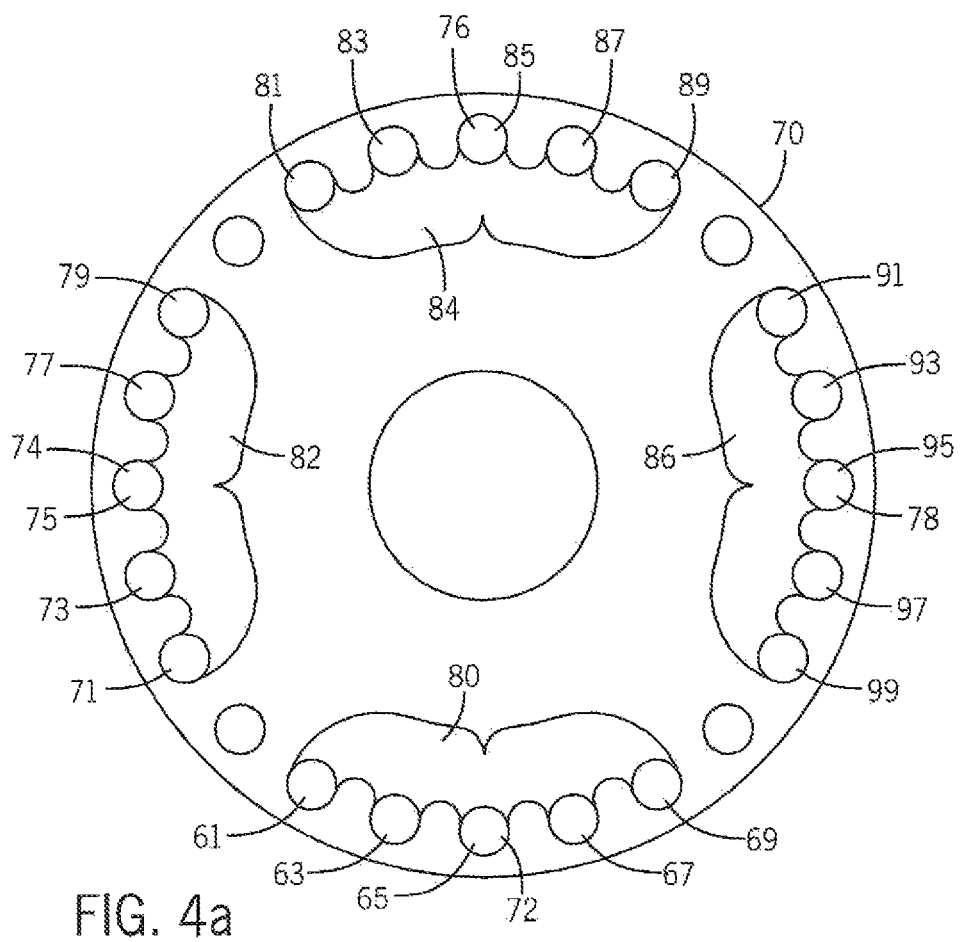
FIG. 4a is a top view of another embodiment of a channel disk that can be used in the modular disk coextrusion die.
Figure 4B:
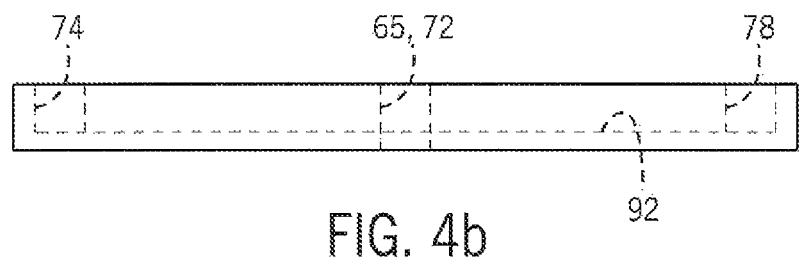
FIG. 4b is a front view of the channel disk of FIG. 4a, with the dotted lines showing selected internal elements.

FIGS. 4a and 4b illustrate another embodiment of a channel disk 70 that includes first, second, third and fourth inlets 72, 74, 76 and 78 evenly spaced apart and located respectively in four quadrants of the channel disk 70. The first, second, third and fourth inlets 72, 74, 76 and 78 feed into respective melt separator channels 80, 82, 84 and 86, each of which separates a respective melt stream into five different streams. The first melt separator channel 80 leads to five outlets 61, 63, 65, 67 and 69. The second melt separator channel 82 leads to five outlets 71, 73, 75, 77 and 79. The third melt separator channel 84 leads to five outlets 81, 83, 85, 87 and 89. The fourth melt separator channel 86 leads to five outlets 91, 93, 95, 97 and 99. In one embodiment, the first, second, third and fourth inlets 72, 74, 76 and 78 each receive a separate first, second third and fourth polymer stream from four separate extruders. In the embodiment shown, the four sets of outlets are located so as to occupy and make use of 20 of the 24 openings positioned around the channel disk 70, whereupon the remaining four openings can then be used as bolt holes to hold the melt channel disk together along with the remaining thin annular disks of the blown film coextrusion die. This achieves maximum balance of the melt streams used to form the layers of the blown film coextrusion bubble. In order to accomplish this, the openings defining the four inlets 72, 74, 76 and 78 are pass-through openings that also define four of the outlets 65, 75, 85 and 95. This balancing can achieve optimal uniformity in layer thickness and optimal bubble stability, thereby facilitating the production of nanolayer films having very thin layers and large numbers of layers.

The melt separator channels 80, 82, 84 and 86 can include a floor 92 if the channel disk 70 is used as an inlet disk to a modular disk coextrusion die, whereupon the floor 92 and the opposing surface of the next adjacent thin annular disk define closed channels. If the channel disk 70 is instead positioned as an interior disk between two other thin annular disks, then the channel disk 70 may or may not include the floor 92, whereupon the nearest surfaces of the adjacent thin annular disks can close the melt separator channels 80, 82, 84 and 86.

The channel disks may have varying configurations, and the specific embodiments described above are merely exemplary. In varying embodiments, the channel disks may have one, two, three, or four inlets, each of which receives a polymer stream from am extruder or from a preceding cell in a modular disk coextrusion die. Each inlet opening may connect to and feed a polymer stream into a melt separator channel which, in turn, feeds the polymer to two, three, four, or five outlets. The channel disks can also be used with modular disk coextrusion dies having varying cell arrangements. In the embodiment described above, wherein each cell includes first and second sub-cells having opposing disk arrangements, the modular disk coextrusion die can include two or more cells stacked together. For example, the modular disk coextrusion die can also include a third cell 100. As with the first and second cells, the third cell 100 can include a central routing disk 5 having at least one flow opening, a first sub-cell 100A on a first side of the central routing disk, and a second sub-cell 100B on a second side of the central routing disk. Each first sub-cell 100A includes a first distribution disk 4, a first transition disk 3, and a first spreader disk 2. Each second sub-cell 100B includes a second distribution disk 6, a second transition disk 7 and a second spreader disk 6. Each of the first and second distribution disks includes a distribution inlet opening 402A, 602B; a plurality of outlet openings 410, 610; and a plurality of channels 406, 606 connecting the distribution inlet opening with the plurality of outlet openings. The distribution inlet opening 402A in the first distribution disk 4 is about 180 degrees opposed to the distribution inlet opening 602B in the second distribution disk 6. In this embodiment, the channel disk can have at least one inlet opening, at least three of the outlet openings per inlet opening, and one or more melt separating channels connecting the at least one inlet opening with the at least three outlet openings. The channel disk and remaining thin annular disks of the modular disk coextrusion die can be configured and arranged so that the at least three outlet openings of the channel disk are in fluid communication with at least three of the distribution disks in the first, second and/or third cells.

In another embodiment, the modular disk coextrusion die can also include fourth and fifth of the cells 100, and/or more than five of the cells 100. As with the first, second and third cells, the fourth and fifth cells 100 (and any additional cells 100) can each include a central routing disk 5 having at least one flow opening, a first sub-cell 100A on a first side of the central routing disk, and a second sub-cell 100B on a second side of the central routing disk. Each first sub-cell 100A includes a first distribution disk 4, a first transition disk 3, and a first spreader disk 2. Each second sub-cell 100B includes a second distribution disk 6, a second transition disk 7 and a second spreader disk 6. Each of the first and second distribution disks includes a distribution inlet opening 402A, 602B; a plurality of outlet openings 410, 610; and a plurality of channels 406, 606 connecting the distribution inlet opening with the plurality of outlet openings. The distribution inlet opening 402A in the first distribution disk 4 is about 180 degrees opposed to the distribution inlet opening 602B in the second distribution disk 6. In this embodiment, the channel disk can have at least one inlet opening, at least five of the outlet openings per inlet opening, and one or more melt separating channels connecting the at least one inlet opening with the at least five outlet openings. The channel disk and remaining thin annular disks of the modular disk coextrusion die can be configured and arranged so that the at least five outlet openings of the channel disk are in fluid communication with at least five of the distribution disks in the first, second, third, fourth and/or fifth cells.

In one embodiment, the channel disk can include at least two of the inlet openings and channels connecting each of the inlet openings with at least two of the outlet openings. In one embodiment, the modular disk coextrusion die can include a number of cells that is at least equal to a total number of outlet openings in the channel disk, and the outlet openings in the channel disk are in fluid communication with at least an equal number of distribution disks in the cells. In one embodiment, the channel disk is positioned at an entrance to a first of the cells. In another embodiment, the channel disk is positioned between two of the cells. In another embodiment, the modular disk coextrusion die can include at least two of the channel disks. In one embodiment, the modular disk coextrusion die can include at least ten of the cells 100 stacked together which, using the above-described opposing disk arrangement, enables the production of a coextruded blown film having at least 20 layers. The multi-cell (e.g., ten-cell) arrangement can be repeated in order to produce multilayer (e.g., nanolayer) blown films having high numbers of layers in a repeating sequence.

The above-described channel disks are not limited to use with the opposing disk arrangements described in the above-identified U.S. Patent Application Publications 20200391425 and 20200391427 but are also useful in other modular disk coextrusion dies, including without limitation the modular disk coextrusion dies described in U.S. Pat Nos. 5,762,971 and 6,000,926, both issued to Schirmer, the disclosures of which are incorporated herein by reference. In this embodiment, the modular disk coextrusion die can include at least first and second cells, each cell including a plurality of thin annular disks arranged in a stacked configuration. Each of the first and second cells includes a first cap disk having a plurality of openings around its perimeter, a first distribution disk, a first transition disk and a first spreader disk. These disks can have the same configurations as the corresponding disks described above with respect to FIG. 5. The modular disk coextrusion die can further include a channel disk having at least one inlet opening, at least two outlet openings per inlet opening, and one or more channels connecting the at least one inlet opening with the at least two outlet openings. The channel disk and other thin annular disks are further configured and arranged so that the first outlet opening in the channel disk is in fluid communication with the first distribution disk in the first cell and the second outlet opening in the channel disk is in fluid communication with the first distribution disk in the second cell.

The foregoing modular disk coextrusion die can be varied by further including a third cell which in turn includes at least a first cap disk having a plurality of openings around its perimeter, a first distribution disk, a first transition disk and a first spreader disk. In this embodiment, the at least one channel disk can have at least three of the outlet openings per inlet opening, and one or more channels connecting the at least one inlet opening with the at least three outlet openings. The channel disk and other thin annular disks are further configured and arranged so that the third outlet opening in the channel disk is in fluid communication with the first distribution disk in the third cell.

The foregoing modular disk coextrusion die can be further varied by including fourth and fifth cells. Each of the fourth and fifth cells includes at least a first cap disk having a plurality of openings around its perimeter, a first distribution disk, a first transition disk and a first spreader disk. In this embodiment, the at least one channel disk can have at least five of the outlet openings per inlet opening, and one or more channels connecting the at least one inlet opening with the at least five outlet openings. The channel disk and other thin annular disks are further configured and arranged so that the fourth outlet opening in the channel disk is in fluid communication with the first distribution disk in the fourth cell and the fifth outlet opening in the channel disk is in fluid communication with the first distribution disk in the fifth cell.

The foregoing modular disk coextrusion die can be further varied as follows. In one embodiment, the channel disk can include at least two of the inlet openings and channels connecting each of the inlet openings with at least two of the outlet openings. In one embodiment, the modular disk coextrusion die can include a number of cells that is at least equal to a total number of outlet openings in the channel disk, and the outlet openings in the channel disk are in fluid communication with at least an equal number of distribution disks in the cells. In one embodiment, the channel disk can be positioned at an entrance to a first of the cells. In another embodiment, the channel disk can be positioned between two of the cells. In another embodiment, the modular disk coextrusion die can include at least two of the channel disks. In one embodiment, the modular disk coextrusion die can include at least ten of the foregoing cells stacked together which, using the above-described disk arrangement, enables the production of a coextruded blown film having at least 10 layers. The multi-cell (e.g., ten-cell) arrangement can be repeated to produce multilayer coextruded blown films (e.g., multilayer nanolayer blown films) having large numbers of layers in a repeating sequence.

Figure 6:
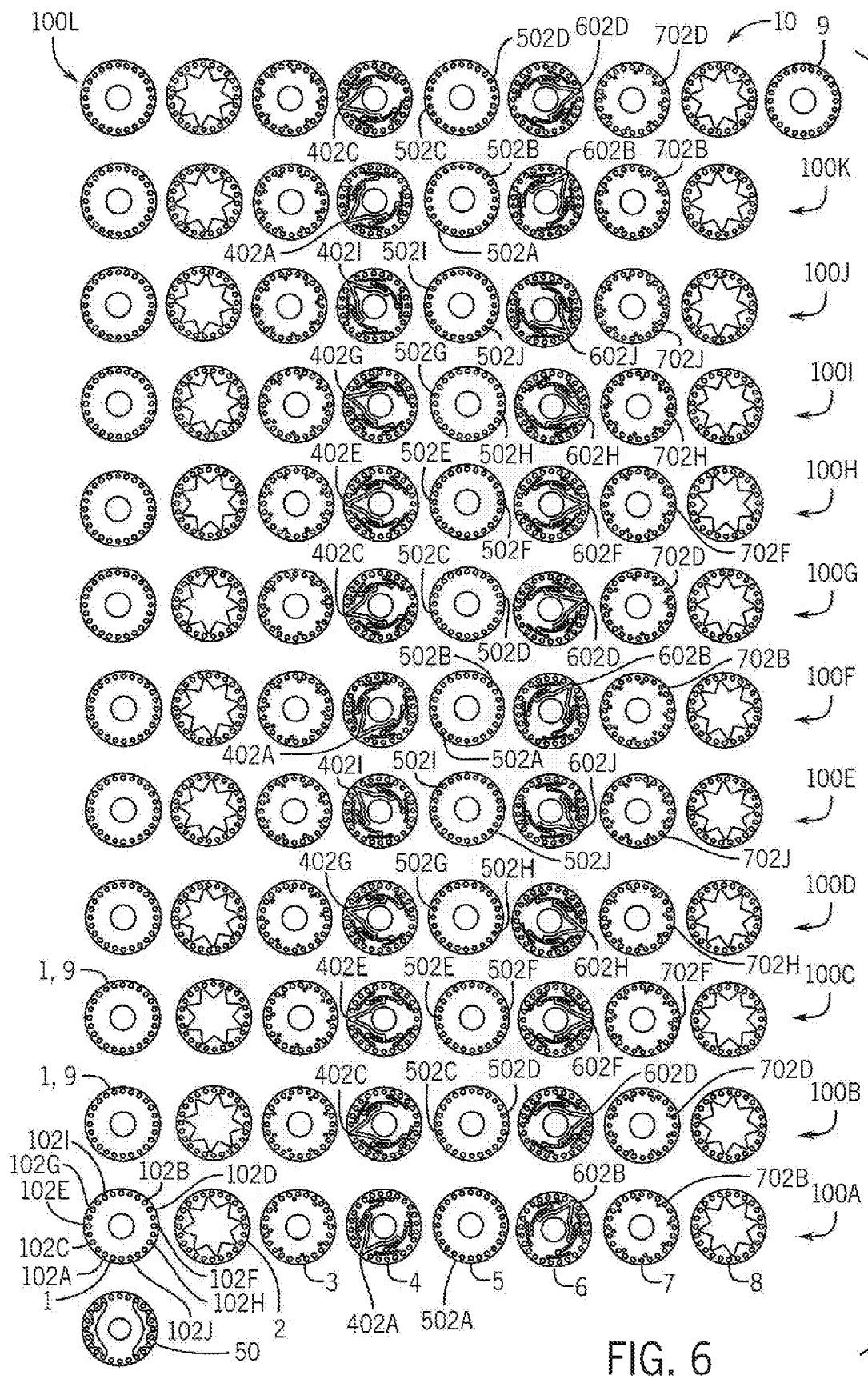
FIG. 6 shows a left-to-right and bottom-to-top lineup of twelve cells of thin annular disks that can be stacked together to form a modular disk coextrusion die utilizing any of the foregoing channel disks, wherein the drawing illustrates the use of the channel disk of FIG. 3a. The thin annular disks are stacked from left-to-right within each individual cell, and the twelve cells are stacked bottom-to-top.

FIG. 6 schematically illustrates an exemplary modular disk coextrusion die 10 having an opposing disk arrangement as described above with respect to FIG. 5 and using a channel disk 50 as shown in FIGS. 3a and 3b to channel five melt streams into inlets 102A, 102C, 102E, 102G and 102I on a first side of cap disk one, and five melt streams into opposing inlets 102B, 102D, 102F, 102H and 102J on a second side of first cap disk 1. In FIG. 6, each row represents a single cell in which the individual disks 1 through 8 are stacked from left-to-right starting with cap disk 1 in the lower left-hand corner. Twelve of the cells 100A through 100L are illustrated in stacked configuration, enabling the production of 24 layers, and additional layers may be added by increasing the number of cells stacked together. As explained above, the function of cap disk 9 of each cell is served by cap disk 1 of each subsequent cell and there is no need for duplicate cap disks proceeding from one cell to the next. However, the second cap disk 9 is needed at the end of the stacking arrangement, at the end of the twelfth cell 100L. The assembled cells are stacked together vertically, with cell 100A at the bottom and cell 100L at the top.

A cursory review of the orientations of the first distribution disks 4 and the second distribution disks 6 in the modular disk coextrusion die in the stacked cells illustrates the principle of operation of the modular disk coextrusion die 10. Progressing from the bottom to top of the stack of cells 100A-100L, the first distribution disks 4 exhibit a repeating sequence of five orientations. The inlet of the distribution disk 4 can be at approximately a 7 o'clock position in cell 100A, an 8 o'clock position in cell 100B, a 9 o'clock position in cell 100C, a 10 o'clock position in cell 100D and an 11 o'clock position in cell 100E, with the sequence repeating for cells 100F, 100G, 100H, 100I and 100J, and then again for cells 100K, 100L and any subsequent cells (not shown). The inlet of the opposing distribution 6 can be at approximately 1 o'clock for cell 100A, 2 o'clock for cell 100B, 3 o'clock for cell 100C, 4 o'clock for cell 100D and 5 o'clock for cell 100E, with the sequence repeating for cells 100F, 100G, 100H, 100I and 100J, and then again for cells 100K, 100L and any subsequent cells. This opposing disk arrangement provides for opposing entry and processing of adjacent layers at regular, symmetrical locations around the blown film bubble and enables the balanced coextrusion of numerous nanolayers in a manner than facilitates excellent thickness control of the very thin nanolayers.

Although not illustrated in FIG. 6, one can readily envision that if the channel disk 70 shown in FIGS. 4a and 4b were instead employed to feed four polymer streams to 20 of the 24 openings in the first cap disk 1 of the first cell 100, then the only openings not used for polymer entry (and instead used as bolt holes to hold the stack of thin annular disks together) would be the opening located at the 7:30 o'clock, 10:30 o'clock, 1:30 o'clock and 4:30 o'clock positions. In that example, a first polymer stream might feed openings at the 5:00, 5:30, 6:00, 6:30 and 7:00 positions, a second polymer stream might feed openings at the 8:00, 8:30, 9:00, 9:30 and 10:00 positions, a third polymer stream might feed openings at the 11:00, 11;30, 12:00, 12:30 and 1:00 positions, and a fourth polymer stream might feed openings at the 2:00, 2:30, 3:00, 3:30 and 4:00 positions.

Referring to FIG. 6, the channel disk 50 can feed five melt streams (e.g., first, third, fifth, seventh and ninth melt streams) originating from a first source into the first cap disk 1 of cell 100, via inlet openings 102A, 102C, 102E, 102G and 102I on a first side of the cap disk 1. The channel disk 50 can feed another five melt streams (e.g., second, fourth, sixth, eighth and tenth melt streams) originating from a second source into the first cap disk 1 via opposing openings 102B, 102D, 102F, 102H and 102I on a second side of the cap disk 1. The first melt stream enters cap disk 1 through feed opening 102A in cell 100A and flows through the corresponding aligned flow openings in disks 2 and 3, and to the distribution inlet opening 402A in the distribution disk 4. Assuming there is no block in the corresponding opening 502A in the central routing disk 5, only some of the first melt stream is processed into a film layer in disks 4, 3, 2 and 1 of the first cell 100A. The remainder of the first melt stream passes completely through the corresponding aligned flow openings in disk 6, 7, 8 and 9 of the first cell 100A, completely through the corresponding aligned flow openings in all nine disks of second, third, fourth and fifth cells 100B, 100C, 100D and 100E, and to the sixth cell 100F.

In the sixth cell 100F, some of the remaining first melt stream enters the distribution inlet opening 402A in the corresponding distribution disk 4 and is processed into a film layer in disks 4, 3, 2 and 1 of the sixth cell 100F. Again, there is no blocking of the corresponding flow opening 502A in the central routing disk 5, thus permitting some of the first melt stream to flow completely through cells 100F, 100G and 100H, 100I and 100J, and into the eleventh cell 100K.

In the eleventh cell 100K, some of the remaining first melt stream enters the distribution inlet opening 402A in the corresponding distribution disk 4 and is processed into a film layer in disks 4, 3, 2 and 1. If the corresponding flow opening 502A in the central routing disk 5 of the eleventh cell 100K is blocked, there will be no further division of the first melt stream. If there is no blocking of the corresponding flow opening 502A in the central routing disk 5, then the remaining first melt stream can flow completely through cells 100K and 100L and into subsequent cells (not shown) to produce additional film layers. The first melt stream can thus be divided three or more ways and can be used to produce three or more nanolayers in a repeating layer sequence in a multilayer coextruded nanolayer film. As will be further apparent from the description below, these layers will be the first, eleventh, twenty-first layers and used to produce the first, sixth and eleventh layers and, if sufficient additional cells are provided, the thirty-first, forty-first, fifty-first, sixty-first and seventy-first layers and so on, in a repeating sequence of nanolayers in a multilayer coextruded nanolayer film.

The second melt steam enters cap disk 1 through an opposing feed opening 102B in the first cell 100A and flows through the corresponding aligned flow openings in disks 2, 3, 4 and 5, and to the distribution inlet opening 602B in the distribution disk 6. Assuming there is no block in the corresponding opening 702B in the transition disk 7 in cell 100A, the second melt stream flows through the modular disk coextrusion die in much the same fashion as described above for the first melt stream. As explained above, the first melt stream was divided among the distribution disks 4 having the same orientation, whose inlet ports 402A corresponded with the inlet 102A in the first cap disk 1. Because the feed inlet 102B for the second melt stream is 180 degrees opposed to the feed inlet 102A for the first melt stream, the second melt stream will similarly be able to enter only the distribution disks 402B whose feed inlets are 180 degrees opposed to the feed inlet 402A that receives the first melt stream.

As shown in FIG. 6, the proper orientation of distribution inlets 602B for receiving the second melt stream exists only in the first cell 100A, the sixth cell 100F, the eleventh cell 100K and the subsequent fifths of any additional cells (not shown), for example, the sixteenth, twenty-first, twenty-sixth and thirty-first cells if such additional cells are included. Accordingly, the second melt stream is processed into three or more film layers using disks 6, 7, 8 and (functional) 9 of cell 100A, disks 6,7, 8 and (functional) 9 of cell 100F, disks 6, 7, 8 and (functional) 9 of cell 100H, and disks 6, 7, 8 and (functional) 9 of each fifth subsequent cell, if such cells are included. As explained above, disk 1 of each subsequent cell 100B, 100G and 100K acts as a functional disk 9 of each preceding cell 100A, 100F and 100J, and there is no need to duplicate the cap disks 9 between cells. The layers formed by the second melt stream will be the second, twelfth, and twenty-second layers and, if sufficient additional cells are present, the thirty-second, forty-second, fifty-second, sixty-second and seventy-second layers and so on, of the coextruded blown film nanolayer film structure.

The third and fourth melt streams enter the first cap disk 1 in cell 100 through feed inlets 102C and 102D, respectively, which are similarly oriented 180 degrees apart from each other. As the third melt stream flows through the modular disk coextrusion die, it will be processed only in those cells whose distribution disks 4 have a distribution inlet opening 402C that corresponds to the feed inlet 102C in the first cap disk 1. As the fourth melt stream flows through the modular disk coextrusion die, it will be processed only in those cells whose distribution disks 6 have an opposing orientation, so that the distribution inlet opening 602D corresponds to the feed inlet 102D in the first cap disk 1.

As shown in FIG. 6, the proper orientation of the distribution disks 4 and 6 receiving the third and fourth melt streams exists only in the second cell 100B, the seventh cell 100G, the twelfth cell 100L, and the subsequent fifths of any additional cells (not shown) that may form part of the modular disk coextrusion die, for example, the seventeenth, twenty-second, twenty-seventh and thirty-second cells if such cells are included. In those distribution disks, the distribution inlet 402C corresponds to the feed inlet 102C for the third melt stream, and the distribution inlet 602D corresponds to the feed inlet 102D for the fourth melt stream. Accordingly, the third melt stream is processed into three or more film layers using disks 4, 3, 2 and 1 of the second cell 100B, disks 4, 3, 2 and 1 of the seventh cell 100G, disks 4, 3, 2 and 1 of the twelfth cell 100L, and, if additional cells are present, disks 4, 3, 2 and 1 of the seventeenth, twenty-second, twenty-seventh and thirty-second cells, and so on. There is no blocking of inlet opening 502C in the central routing disk until the final cell in this sequence. The third melt stream will form the third, thirteenth and twenty-third layers and, if sufficient additional cells are present, the thirty-third, forty-third, fifty-third, sixty-third and seventy-third layers and so on, of the coextruded blown film nanolayer film structure.

The fourth melt stream is processed into three or more film layers using disks 6, 7, 8 and (functional) 9 of the second cell 100B, disks 6, 7, 8 and (functional) 9 of the seventh cell 100G, disks 6, 7, 8 and (functional) 9 of the twelfth cell 100L, and, if additional cells are present, disks 6, 7, 8 and (functional) 9 of the seventeenth, twenty-second, twenty-seventh and thirty-second cells, and so on. There is no blocking of inlet opening 502D in the central routing disk until the final cell in this sequence. The fourth melt stream will form the fourth, fourteenth and twenty-fourth layers and, if sufficient additional cells are present, the thirty-fourth, forty-fourth, fifty-fourth, sixty-fourth and seventy-fourth layers and so on, of the coextruded blown film nanolayer film structure.

The fifth and sixth melt streams enter the first cap disk 1 in cell 100 through feed inlets 102E and 102F, respectively, which are oriented 180 degrees apart from each other. As the fifth melt stream flows through the modular disk die, it will be processed only in those cells whose distribution disks 4 have a distribution inlet opening 402E that corresponds to the feed inlet 102E in the first cap disk 1. As the sixth melt stream flows through the modular disk die, it will be processed only in those cells whose distribution disks 6 have an opposing orientation, so that the distribution inlet opening 602F corresponds to the feed inlet 102F in the first cap disk 1.

As shown in FIG. 6, the proper orientation of the distribution disks 4 and 6 for receiving the fifth and sixth melt streams exists only in the third cell 100C, the eighth cell 100H, and the subsequent fifths of any additional cells (not shown) that may form part of the modular disk coextrusion die, for example, the thirteenth, eighteenth, twenty-third, twenty-eighth and thirty-third cells if such cells are included. In those distribution disks, the distribution inlet 402E corresponds to the feed inlet 102E for the fifth melt stream and the distribution inlet 602F corresponds to the feed inlet 102F for the sixth melt stream. Accordingly, the fifth melt stream is processed into two or more film layers using disks 4, 3, 2 and 1 of the third cell 100C, disks 4, 3, 2 and 1 of the eighth cell 100H and, if additional cells are present, disks 4, 3, 2 and 1 of the thirteenth, eighteenth, twenty-third, twenty-eighth and thirty-third cells, and so on. There is no blocking of inlet opening 502E in the central routing disk until the final cell in this sequence. The fifth melt stream will form the fifth and fifteenth layers and, if sufficient additional cells are present, the twenty-fifth, thirty-fifth, forty-fifth, fifty-fifth, sixty-fifth and seventy-fifth layers and so on, of the coextruded blown film nanolayer film structure.

The sixth melt stream is processed into two or more film layers using disks 6, 7, 8, and (functional) 9 of the third cell 100C, disks 6, 7, 8 and (functional) 9 of the eight cell 100H and, if additional cells are present, disks 4, 3, 2 and 1 of the thirteenth, eighteenth, twenty-third, twenty-eighth and thirty-third cells, and so on. There is no blocking of inlet opening 502F in the central routing disk until the final cell in this sequence. The sixth melt stream will form the sixth and sixteenth film layers and, if sufficient additional cells are present, the twenty-sixth, thirty-sixth, forty-sixth, fifty-sixth, sixty-sixth and seventy-sixth layers and so on, of the coextruded blown film nanolayer film structure.

The seventh and eighth melt streams enter the first cap disk 1 in cell 100 through feed inlets 102G and 102H, respectively, which are oriented 180 degrees apart from each other. As the seventh melt stream flows through the modular disk die, it will be processed only in those cells whose distribution disks 4 have a distribution inlet opening 402G that corresponds to the feed inlet 102G in the first cap disk 1. As the eighth melt stream flows through the modular disk die, it will be processed only in those cells whose distribution disks 6 have an opposing orientation, so that the distribution inlet opening 602H corresponds to the feed inlet 102H in the first cap disk 1.

As shown in FIG. 6, the proper orientation of the distribution disks 4 and 6 for receiving the seventh and eighth melt streams exists only in the fourth cell 100D, the ninth cell 100I, and the subsequent fifths of any additional cells (not shown) that may form part of the modular disk coextrusion die, for example, the fourteenth, nineteenth, twenty-fourth, twenty-ninth and thirty-fourth cells if such cells are included. In those distribution disks, the distribution inlet 402G corresponds to the feed inlet 102G for the seventh melt stream and the distribution inlet 602H corresponds to the feed inlet 102H for the eighth melt stream. Accordingly, the seventh melt stream is processed into two or more film layers using disks 4, 3, 2 and 1 of the fourth cell 100C, disks 4, 3, 2 and 1 of the ninth cell 100G and, if additional cells are present, disks 4, 3, 2 and 1 of the fourteenth, nineteenth, twenty-fourth, twenty-ninth and thirty-fourth cells, and so on. There is no blocking of inlet opening 502G in the central routing disk until the final cell in this sequence. The seventh melt stream will form the seventh and seventeenth layers and, if sufficient additional cells are present, the twenty-seventh, thirty-seventh, forty-seventh, fifty-seventh, sixty-seventh and seventy-seventh layers and so on, of the coextruded blown film nanolayer film structure.

The eighth melt stream is processed into two or more film layers using disks 6, 7, 8, and (functional) 9 of the fourth cell 100C, disks 6, 7, 8 and (functional) 9 of the ninth cell 100H and, if additional cells are present, disks 4, 3, 2 and 1 of the fourteenth, nineteenth, twenty-fourth, twenty-ninth and thirty-fourth cells, and so on. There is no blocking of inlet opening 502H in the central routing disk until the final cell in this sequence. The eighth melt stream will form the eighth and eighteenth film layers and, if sufficient additional cells are present, the twenty-eighth, thirty-eighth, forty-eighth, fifty-eighth, sixty-eighth and seventy-eighth layers and so on, of the coextruded blown film nanolayer film structure.

The ninth and tenth melt streams enter the first cap disk 1 in cell 100 through feed inlets 102I and 102J, respectively, which are oriented 180 degrees apart from each other. As the ninth melt stream flows through the modular disk die, it will be processed only in those cells whose distribution disks 4 have a distribution inlet opening 402I that corresponds to the feed inlet 102I in the first cap disk 1. As the tenth melt stream flows through the modular disk die, it will be processed only in those cells whose distribution disks 6 have an opposing orientation, so that the distribution inlet opening 602J corresponds to the feed inlet 102J in the first cap disk 1.

As shown in FIG. 6, the proper orientation of the distribution disks 4 and 6 for receiving the ninth and tenth melt streams exists only in the fifth cell 100E, the tenth cell 100J, and the subsequent fifths of any additional cells (not shown) that may form part of the modular disk coextrusion die, for example, the fifteenth, twentieth, twenty-fifth, thirtieth and thirty-fifth cells if such cells are included. In those distribution disks, the distribution inlet 4021 corresponds to the feed inlet 102I for the ninth melt stream and the distribution inlet 602J corresponds to the feed inlet 102J for the tenth melt stream. Accordingly, the ninth melt stream is processed into two or more film layers using disks 4, 3, 2 and 1 of the fifth cell 100E, disks 4, 3, 2 and 1 of the tenth cell 100J and, if additional cells are present, disks 4, 3, 2 and 1 of the fifteenth, twentieth, twenty-fifth, thirtieth and thirty-fifth cells, and so on. There is no blocking of inlet opening 502I in the central routing disk until the final cell in this sequence. The ninth melt stream will form the ninth and nineteenth layers and, if sufficient additional cells are present, the twenty-ninth, thirty-ninth, forty-ninth, fifty-ninth, sixty-ninth and seventy-ninth layers and so on, of the coextruded blown film nanolayer film structure.

The tenth melt stream is processed into two or more film layers using disks 6, 7, 8, and (functional) 9 of the fifth cell 100E, disks 6, 7, 8 and (functional) 9 of the tenth cell 100J and, if additional cells are present, disks 4, 3, 2 and 1 of the fifteenth, twentieth, twenty-fifth, thirtieth and thirty-fifth cells, and so on. There is no blocking of inlet opening 502J in the central routing disk until the final cell in this sequence. The tenth melt stream will form the tenth and twentieth film layers and, if sufficient additional cells are present, the thirtieth, fortieth, fiftieth, sixtieth, seventieth and eightieth layers and so on, of the coextruded blown film nanolayer film structure.

The number of cells in the modular disk coextrusion die can be increased to enable production of blown films having several hundred layers. One feature that enables this is the use of very thin disks made of a strong material, such as 16-gauge stainless steel or 22-gauge stainless steel. In one embodiment, the cap disks 1 and 9 (if used) and the central routing disk 5 can each be made of stainless steel, the spreader disks 2 and 8 and distribution disks 4 and 6 can each be made of 16-gauge stainless steel, and the transition disks 2 and 7 can each be made of 16-gauge or 22-gauge stainless steel. Adjacent disks can also be spot-welded or laser-welded together, or fastened together with roll pins, for improved strength and integrity. Adjacent disks can also be cold welded together using a patented process available from Meld Manufacturing Corporation in Christiansburg, Va. For example, a cap disk can be fastened together with a spreader disk, a central routing disk can be fastened together with two distribution disks (one on each side), and/or a transition disk can be fastened together with a spreader disk.

When welding adjacent disks together, it is important to avoid forming high points or mounds on the disks that might interfere with their interfacial contact. Such mounds can be avoided by forming small (e.g., 0.125 inch) openings in the disks at the location of the welds. The small (e.g. 0.125 inch) openings may also serve as strengthening and alignment points for insertion of 0.125-inch roll pins of suitable length so that welding may not be needed. One advantage of roll pins is that they can be inserted and later removed, whereas welding is permanent. A typical roll pin includes a hollow tube with a slot opening extending lengthwise along its outer surface. When the roll pin is squeezed, inserted into an opening and released, it acts like a spring as the roll pin grips the opening that it is inserted into. The spring force keeps the adjacent disks from coming apart. This technique is further described in the above-identified U.S. Patent Application Publications 20200391425 and 20200391427, both to Schirmer, the disclosures of which are incorporated herein by reference.

Alternatively, the formation of high points can be avoided by employing a cold welding process available from Meld Manufacturing Corporation in Christiansburg, Va. Variations of the cold welding process are described in various U.S. patents issued to Aeroprobe Corporation including, for example, U.S. Pat No. 10,105,790, U.S. Pat No. 9,862,054, U.S. Pat No. 9,511,446, U.S. Pat No. 9,511,445, and U.S. Pat No. 8,893,954. The cold welding process is believed capable of amalgamating any metal, not limited to silver, and can be used to weld the thin, annular disks together without distortion.

Figure 1:
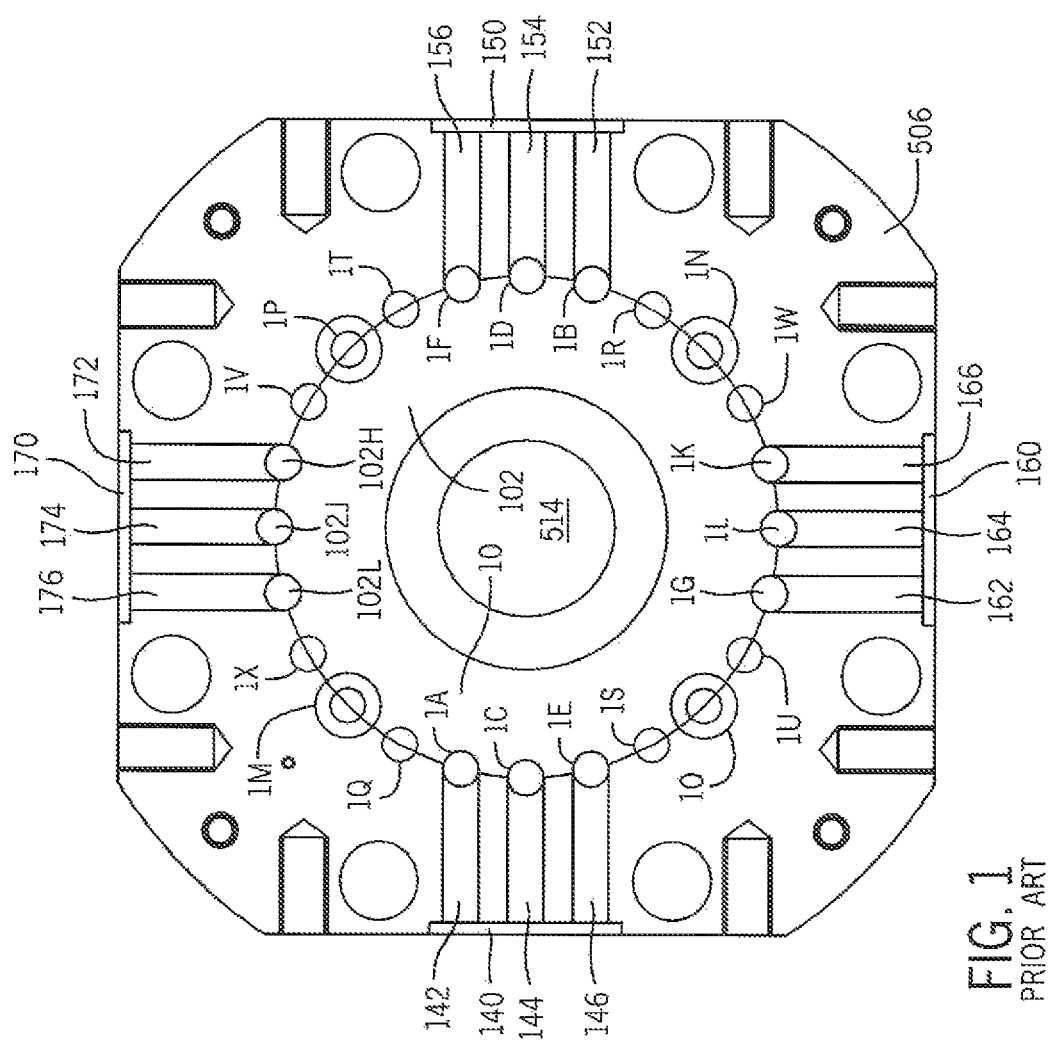
FIG. 1 schematically illustrates an entry section of one embodiment of a prior art modular disk coextrusion die assembly, showing three melt extrusion inlets in each of four quadrants, wherein each group of three melt inlets is formed by splitting the melt stream from a corresponding single extruder before the melt streams reach the die.
Figure 7:
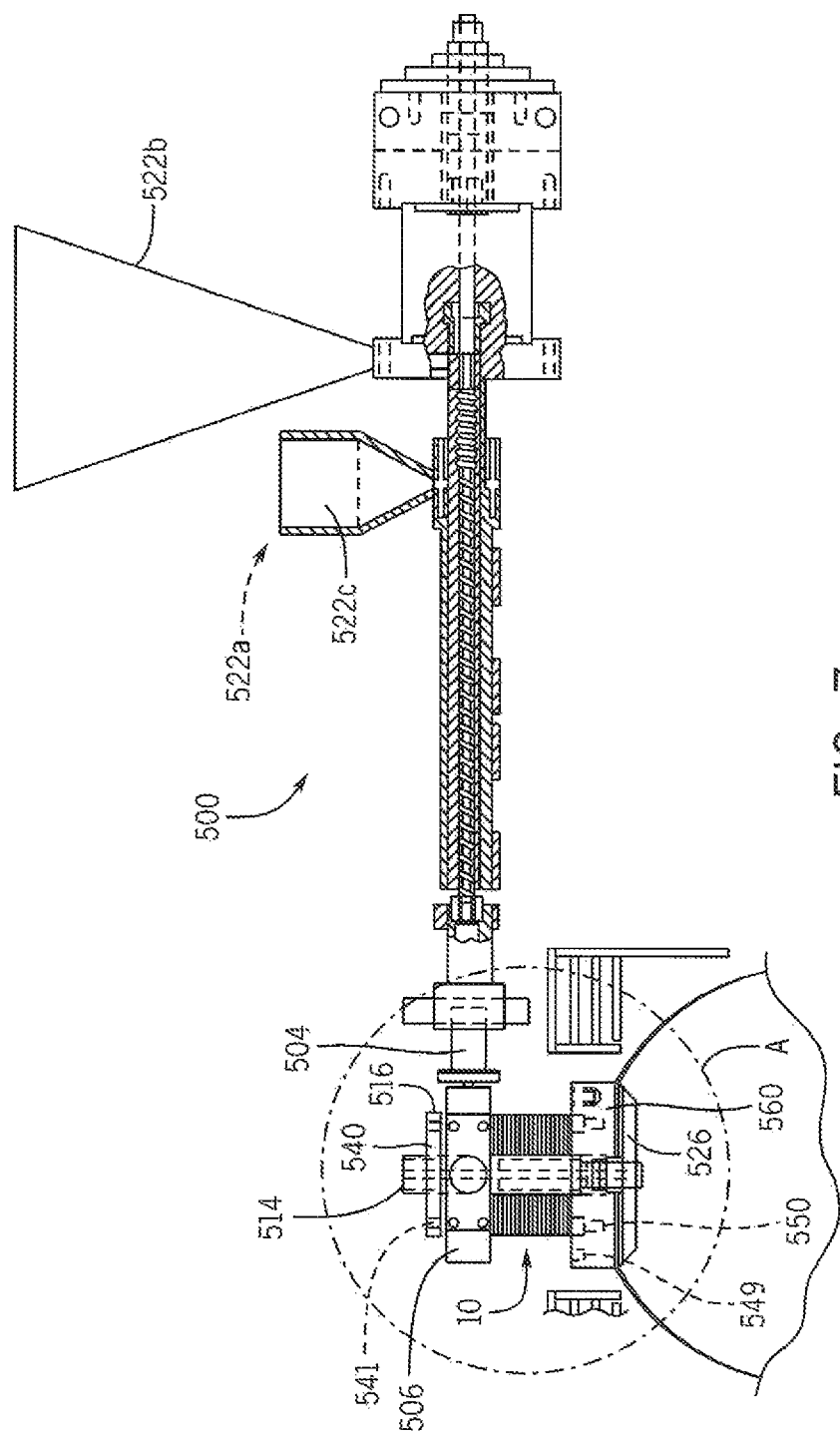
FIG. 7 is an exemplary cross-sectional view of a coextrusion device which may employ a modular disk coextrusion die utilizing one or more channel disks.

The modular disk coextrusion die 10 formed of the plurality of cells 100A through 100L can be assembled and connected to a plurality of extruders using known techniques, such as those described in U.S. Pat No. 5,762,971, issued to Schirmer, the disclosure of which is incorporated by reference. For ease of description, FIG. 1 of U.S. Pat No. 5,762,971 is included herewith as FIG. 7, with some modification. Referring to FIG. 7, the coextrusion device 500 includes a central extruder delivery system 512b and two satellite extruder delivery systems 512a (not shown) and 512c, employing a modular disk coextrusion die 10 constructed of thin annular disks as described above. The extruder delivery systems 512a, 512b and 512c may be driven using common or separate drives and may be used to deliver three polymer resins or melt streams, or more than three if the melt streams are split. The modular disk coextrusion die 10 is sandwiched between an inlet plate 540 and an outlet plate 560 which are snugly bolted together using threaded bolt assemblies 541 and 550 in order to maintain the thin annular disks in a snug-fitting arrangement. Although only one extruder is illustrated, the extruder delivery systems 512a, 512b and 512c may be repeated around two to four locations to feed polymer into the modular disk coextrusion die 10 using channel disks such as the channel disks 20, 50 and 70 described above with respect to FIGS. 2a, 2b, 3a, 3b, 4a and 4b.

In the extrusion device 500 of FIG. 7, the modular disk coextrusion die 10 is oriented for downward extrusion of a blown film bubble, in contrast to the upward extrusion arrangement described with respect to FIG. 6. Thus, the extrusion device feeds the melt streams to the top of the modular disk coextrusion die 10 through an extension 504 and die plate 506, and the melt streams flow downward through the die 10. A mandrel 514 passes through the annular center of the modular disk coextrusion die 10, allowing enough space for the multilayer tube to pass through the annular center around the mandrel as the layers are being formed. While the illustration in FIG. 7 is exemplary, the parts are not shown proportional to size. For instance, the modular disk coextrusion die 10 will be relatively taller and the number of thin annular disks will be greater when several of the individual cells are stacked together as shown in FIG. 6.

Figure 8:
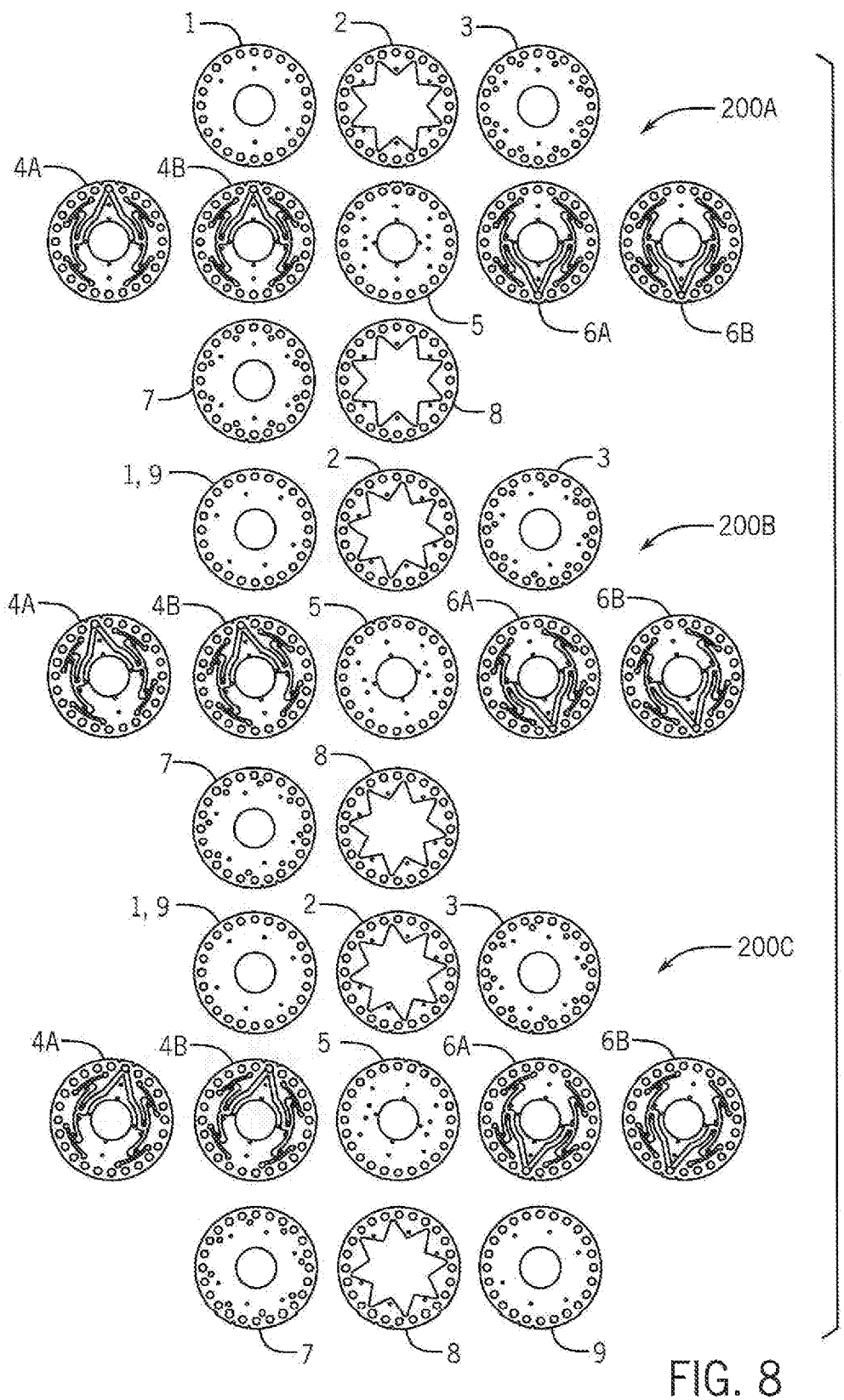
FIG. 8 schematically illustrates an opposing disk arrangement in which some of the thin annular disks are doubled to effectively provide thicker disks.

As will be appreciated by persons of ordinary skill in the art, some of the thin annular disks in an individual cell can be replicated in sequence to create what is, in effect, a thicker version of the same thin annular disk. FIG. 8 schematically illustrates an embodiment of a single cell 200 in which the distribution disks have been doubled to provide thicker versions thereof. Cell 200 includes, in numerical order from top to bottom or from bottom to top (depending on the direction of extrusion), first cap disk 1, spreader disk 2, transition disk 3, distribution disks 4A and 4B, central routing disk 5, distribution disks 6A and 6B, transition disk 7, spreader disk 8, and optional second cap disk 9. As with the above-described embodiment, the first cap disk 1 of each subsequent cell can perform the function of second cap disk 9 in the preceding cell, thus alleviating the need for a second cap disk 9 between adjacent cells. The cell 200 functions the same as the cell 100 described above, except that the doubling of distribution disks 4A and 4B and the doubling of distribution disks 6A and 6B provide thicker overall distribution disks 4 and 6 for easier distribution of the melt. Other disks in the cell can similarly be doubled, or more than doubled, to create thicker disks that perform the respective functions more easily. The ability to multiply the effective thickness of selected disks by stacking two or more identical disks together is especially useful when the melt stream contains a high velocity polymer, or another polymer that is more difficult to process. Depending on the needs of the specific application, the cell 200 of FIG. 8 (or any cell in which the thickness of one or more disks has been multiplied) can replace selected ones or all of the cells 100A-100L in FIG. 6.

The large number of layers is enabled by the relative thinness of the disks and the fact that they can be fastened together for improved strength as described above. In one exemplary embodiment, each individual cell 100 (consisting of 8-11 disks) has a diameter of 8 inches and a thickness of about 0.43 inch. A 1X die may use a single mandrel that provides a collective disk height of up to about 17 inches. This provides for as many as 40 cells (17 divided by 0.43), which can produce 80 nanolayers. A 2X die may use two mandrels that can provide a maximum height of about 31 inches for cells. This provides for as many as 72 cells (31 divided by 0.43), which can produce 144 nanolayers. A 3X die may have three mandrels that can provide a maximum height of about 45 inches for cells. This provides for as many as 105 cells (45 divided by 0.43), which can produce 210 nanolayers. By combining larger numbers of mandrels, and/or using longer mandrels, the number of nanolayers can be increased to any desired level.

The modular disk coextrusion die 10 with the opposing disk arrangement enables the production of a wide variety of complex multilayer coextruded annular films, each including many continuous unbroken and non-overlapping annular nanolayers arranged in sequence. The phrase "continuous, unbroken and non-overlapping" means that each of the nanolayers and the overall film is a) continuous in the annular direction, b) devoid of breaks and discontinuities in the annular direction, and c) devoid of overlapping folds, i.e., no annular portion of any nanolayer or the overall film is folded over onto itself in a manner that would multiply the film thickness at that location.

The modular disk coextrusion die 10 is especially suitable for producing nanolayer films having large numbers of nanolayers and exhibiting high levels of transparency and/or thermoformability. Barrier films containing various layer combinations of polyethylene terephthalate glycol (PETG) ethylene acrylic acid (EAA), low-density or linear low density polyethylene (LDPE or LLDPE) and ethylene-vinyl alcohol (EVOH) have been found to exhibit excellent transparency and thermoformability and similar film combinations made using nylon-6 exhibit high transparency as well as thermoformability at tailored layer thicknesses. Other polyester homopolymers and copolymers cam also be used in place of or in addition to the PETG. Exemplary polyester homopolymers include without limitation polyethylene terephthalate, polybutylene terephthalate, and combinations thereof. Polyester homopolymers provide excellent transparency but are generally not heat sealable. In order to provide the nanolayer film with heat sealability, one or both of the outer layers can be formed using a polyester copolymer. Suitable polyester copolymers include without limitation polyethylene terephthalate glycol, polyethylene terephthalate -1,4-cyclohexane-2 methyl ester, polyester-polyether block copolymers, and combinations thereof. Polyethylene terephthalate glycol (PETG) is particularly suitable for one or both outer film layers because it provides excellent heat sealability and transparency. For optimal transparency, the polyester copolymer can have a degree of crystallinity of less than about 20%, suitably less than about 15%, measured using ASTM D1505.

The nanolayers of the films, including those described below, can be as thin as possible in order to provide the multilayer coextruded nanolayer films 10 with maximum transparency. The term "nanolayers" refers to film layers having thicknesses in the submicron range, typically between about 1 to about 999 nanometers, or about 10 to about 500 nanometers, or about 20 to about 100 nanometers. Film clarity is a measure of percent light transmittance and can be measured using ASTM D1746. For example, when a film is exposed to 100% of an incident light source, the transmittance is 100% minus (percent absorption +percent reflection). For optimal performance and appearance, the multilayer coextruded nanolayer film produced using the modular disk coextrusion die 10 can have a light transmittance of at least about 80%, suitably at least about 84%, or at least about 88%.

The multilayer coextruded nanolayer film can also include adhesive tie nanolayers that bond the remaining nanolayers together and exhibit adhesive bonding both to moisture barrier nanolayers (for example, LDPE or LLDPE) and oxygen barrier nanolayers (for example, EVOH or polyamide) in order to bond them together. The adhesive tie layers can be formed of a soft polymer that exhibits tackiness without compromising film clarity. Suitable soft polymers include without limitation ethylene methyl acrylate (EMA), ethylene ethyl acrylate (EEA), ethylene acrylic acid (EAA), ethylene methacrylic acid (EMMA), and combinations thereof. EEA and EAA are particularly suitable as nanolayer tie layers that provide excellent adhesion and transparency because of their low crystallinity and high clarity. The foregoing adhesives can also be blended with other adhesive materials, such as chemically-modified polyolefins, provided that the desired clarity can be maintained. Suitable chemically-modified polyolefins include without limitation anhydride-modified polyethylenes, including low density or linear low density polyethylene grafted with maleic anhydride. The chemically-modified polyolefin can improve the adhesion between the polar oxygen barrier layers (foe example, EVOH or polyamide) and the moisture barrier layers (for example, LDPE or LLDPE) and can also bond well to the PETG or other polyester copolymer used for outer heat seal layers. The adhesive tie layers can suitably be nanolayers having only the thickness needed to ensure adequate bonding between adjacent layers.

When used as moisture barrier layers, the LDPE or LLDPE nanolayers can be selected to have relatively low crystallinity in order to maintain optimal transparency. Nanolayers formed using low density polyethylene or linear low density polyethylene can be selected to have a crystallinity at the lower end of the conventional range for optimal clarity. Low density and linear low density polyethylene typically have crystallinities ranging from about 35% to about 60%. When used as nanolayers in a transparent and/or thermoformable film structure, the low density or linear low density polyethylene can be selected to have a crystallinity at the lower end of the normal range, suitably about 35% to about 45%, or about 35% to about 40%, and can have a density of about 0.910 to about 0.925 grams/cm$^3$.

The modular disk coextrusion die 10 using the channel disk 20, 50 or 70, or any other suitable channel disk, can be used to produce complex films in which any sequence of nanolayers formed using up to twenty polymer melt streams can be optimized to provide optimal combinations of oxygen barrier, moisture barrier, strength and/or other desired properties. Large sequences of layers called "repeating units" can be included in the nanolayer films and can be repeated many times. In one embodiment, the multilayer coextruded annular film including the plurality of continuous unbroken and overlapping nanolayers can include a number "x" of repeating units that define a repeating sequence of nanolayers. Each repeating unit includes a number "y" of nanolayers and includes at least three layers having polymer compositions that differ from each other. The number "x" is an integer of at least 2, or at least 3, or at least 4, or at least 5, or at least 6, or at least 7, or at least 8, or at least 9, or at least 10, or at least 11, or at least 12. The number "y" is an integer of at least 3, or at least 4, or at least 5, or at least 6, or at least 7, or at least 8, or at least 9, or at least 10, or at least 11, or at least 12. The product of x multiplied by y is at least 24, or at least 36, or at least 48, or at least 60, or at least 72, or at least 84, or at least 96, or at least 108, or at least 120, or at least 132, or at least 144, or at least 156, or at least 168, or at least 180, or at least 192, or at least 204. Depending in part on the number "y" of nanolayers in each repeating unit, at least three, or at least four, or at least five, or at least six, or at least seven, or at least eight, or at least nine, or at least ten, or at least eleven, or at least twelve of the nanolayers in the repeating unit have polymer compositions that differ from each other.

Various combinations of "x," "y" and the product of "x" and "y" are contemplated. In one embodiment, "x" is at least 2 and "y" is at least 12. In another embodiment, "x" is at least 3 and "y" is at least 8. In another embodiment, "x" is at least 4 and "y" is at least 6. In another embodiment, "x" is at least 6 and "y" is at least 4. In another embodiment, "x" is at least 8 and "y" is at least 3. In another embodiment, "x" is at least 8 and "y" is at least 4. In another embodiment, "x" is at least 24 and "y" is at least 4. In another embodiment, "x" is at least 24 and "y" is at least 3. In another embodiment, "x" is at least 64 and "y" is at least 3. In another embodiment, "x" is at least 48 and "y" is at least 4. The foregoing embodiments are exemplary and non-limiting. And combination of "x," "y" and the product of "x" and "y" is contemplated, so long as "x" is at least 2, "y" is at least 3, and the product of "x" and "y" is at least 24.

The nanolayer film structures can include a wide variety of polymer combinations designed to optimize properties such as oxygen barrier, moisture barrier, adhesion between layers, film strength and optics. Examples of oxygen barrier polymers include without limitation polyamides, ethylene vinyl alcohols, polyketones, polyvinyl chlorides, copolymers of vinyl chloride and methyl acrylate, copolymers of vinyl chloride and ethyl acrylate, and combinations thereof. Polyamides include without limitation Nylon 6, Nylon 4-6, Nylon 6-6, Nylon 6-9, Nylon 6-10, Nylon 6-12, Nylon 11 and Nylon 12. Ethylene vinyl alcohol includes copolymers of ethylene and vinyl alcohol having ethylene contents ranging from about 25% to about 50% by mol, including without limitation those having molar ethylene contents of 27%, 29%, 32%, 38%, 44% and 48%. Polyketones are copolymers and terpolymers of olefins and carbon monoxide, including without limitation ethylene-carbon monoxide, propylene-carbon monoxide, ethylene-propylene-carbon monoxide and the like. Polyketones and polyvinyl chlorides provide both oxygen barrier and moisture barrier, unlike many gas barrier polymers that provide oxygen barrier but little or no moisture barrier.

Moisture barrier polymers include without limitation polyolefins such as polyethylene, polypropylene, polybutene, ethylene-alpha olefin copolymers; polyvinyl chlorides (especially polyvinyl dichloride); and polyketones. Polyethylenes include high density polyethylene and branched low density polyethylene. Ethylene-alpha olefin copolymers are copolymers of ethylene and one or more comonomers selected from $C_3$ to $C_{10}$ alpha-olefins. Examples include linear medium density polyethylene, linear low density polyethylene, very low desnity polyethylene and ultra-low density polyethylene. The most common comonomers are propylene, butene, hexene and octene. The density generally decreases as the amount of comonomer is increased.

Adhesive tie resins are typically needed to bond oxygen barrier and moisture barrier layers together, and/or to bond both oxygen barrier and moisture barrier layers to the high strength polymer layers described below. Adhesive tie resins include without limitation ethylene vinyl acetate, ethylene methyl acrylate, ethylene ethyl acrylate, ethylene methyl methacrylate, ethylene acrylic acid, ethylene methacrylic acid, anhydride-modified polyolefins such as polyethylene, polypropylene and polybutene, anhydride-modified ethylene-alpha olefin copolymers, and ionomers. Elastomers such as styrene-butadiene, styrene-butadiene-styrene, styrene-ethylene-butadiene-styrene, and polycaprolactones can also be used alone or in combination with other adhesive tie polymers to provide enhanced adhesion between adjacent layers.

High strength polymers can be employed to provide enhanced film strength, abuse resistance and, in some cases, improved optical properties. High strength polymers include without limitation polyesters such as polyethylene terephthalate, polybutylene terephthalate, polyethylene terephthalate-1,4-cyclohexane-2-methyl ester, polycarbonate, polycyclohexylene-dimethylene terephthalate, polyphthlate carbonate, polytrimethylene terephthalate; polycarbonates; polystyrenes; polyvinyl chlorides; polyacrylonitrile; and styrene acrylonitrile.

Examples of multilayer coextruded annular films that possess the continuous unbroken and non-overlapping nanolayers include films having any of the foregoing combinations of "x" and "y" in the repeating units, and including, but not limited to, the following examples:

1. A multilayer coextruded annular film including a plurality of continuous unbroken and non-overlapping annular nanolayers arranged in sequence;

the plurality of nanolayer comprising a number "x" of repeating units defining a repeating sequence of nanolayers;

each repeating unit including a number "y" of nanolayers, including at least three nanolayers having polymer compositions that differ from polymer compositions of each other;

wherein "x" is an integer of at least 2, "y" is an integer of at least 3, and "x" multiplied by "y" is at least 24.

2. The multilayer coextruded annular film (1), wherein "x" is at least 2 and "y" is at least 12.

3. The multilayer coextruded annular film (1), wherein "x" is at least 3 and "y" is at least 8.

4. The multilayer coextruded annular film (1), wherein "x" is at least 4 and "y" is at least 6.

5. The multilayer coextruded annular film (1), wherein "x" is at least 6 and "y" is at least 4.

6. The multilayer coextruded annular film (1), wherein "x" is at least 8 and "y" is at least 3.

7. Any of the preceding multilayer coextruded annular films (1) to (6), wherein at least one nanolayer in the repeating unit includes a polyamide, at least one nanolayer in the repeating unit includes an ethylene vinyl alcohol, and at least one nanolayer in the repeating unit includes an adhesive tie resin.

8. Any of the preceding multilayer coextruded annular films (1) to (6), wherein at least one nanolayer in the repeating unit includes a polyolefin, at least one nanolayer in the repeating unit includes a polyamide, and at least one nanolayer in the repeating unit includes an adhesive tie resin.

9. Any of the preceding multilayer coextruded annular films (1) to (6), wherein at least one nanolayer in the repeating unit includes a polyolefin, at least one nanolayer in the repeating unit includes an ethylene vinyl alcohol, and at least one nanolayer in the repeating unit includes an adhesive tie resin.

10. Any of the preceding multilayer coextruded annular films (1) to (6), wherein at least one nanolayer in the repeating unit includes a polyester, at least one nanolayer in the repeating unit includes a polyolefin, and at least one nanolayer in the repeating unit includes an adhesive tie resin.

11. The multilayer coextruded annular film (10), wherein the polyester includes polyethylene terephthalate (PET) or polyethylene terephthalate glycol (PETG), the polyolefin includes low density polyethylene (LDPE) or linear low density polyethylene (LLDPE), the adhesive tie resin comprises ethylene methyl acrylate (EMA), ethylene ethyl acrylate (EEA) or ethylene acrylic acid (EAA), and the repeating unit includes a sequence of nanolayers that include the following polymers in either order: polyester/adhesive/polyolefin.

12. The multilayer coextruded annular film (10), wherein the polyester includes polyethylene terephthalate-1,4-cyclohexane-2-methyl ester, the polyolefin includes polyethylene, the adhesive tie resin includes ethylene methyl acrylate, and the repeating unit includes a sequence of nanolayers that include the following polymers in either order: polyethylene terephthalate -1,4-cyclohexane-2 methyl ester/ethylene methyl acrylate/polyethylene.

13. Any of the preceding multilayer coextruded annular films (1) to (6), wherein at least one nanolayer in the repeating unit includes a polycarbonate, at least one nanolayer in the repeating unit includes a polyolefin, and at least one nanolayer in the repeating unit includes an adhesive tie resin.

14. The multilayer coextruded annular film (13), wherein the polyolefin includes polyethylene, the adhesive tie resin includes ethylene methyl acrylate, and the repeating unit comprises a sequence of nanolayers that include the following polymers in either order: polycarbonate/ethylene methyl acrylate/polyethylene.

15. Any of the preceding multilayer coextruded annular films (1) to (6), wherein at least one nanolayer in the repeating unit includes ethylene vinyl alcohol, at least two nanolayers in the repeating unit include an adhesive tie resin, and at least one nanolayer in the repeating unit includes a polyamide.

16. Any of the preceding multilayer coextruded annular films (1) to (6), wherein at least one nanolayer in the repeating unit includes ethylene vinyl alcohol, at least two nanolayers in the repeating unit include a polyamide, at least one layer in the repeating unit includes a polyolefin, and at least one layer in the repeating unit includes an adhesive tie resin.

17. Any of the preceding multilayer coextruded annular films (1) to (6), wherein the repeating unit includes a sequence of nanolayers that include the following polymers in either order: polyethylene/polyethylene/tie resin/Nylon 6/tie resin/ethylene vinyl alcohol/tie resin/Nylon 6-10/tie resin/ethylene vinyl alcohol/tie resin/Nylon 6-10.

18. Any of the preceding multilayer coextruded annular films (1) to (6), wherein the repeating unit includes a sequence of nanolayers that include the following polymers in either order: ethylene vinyl alcohol/tie resin/polyethylene/tie resin/Nylon 6/tie resin/Nylon 6-10/tie resin.

19. Any of the preceding multilayer coextruded annular films (1) to (6), wherein the repeating unit includes a sequence of nanolayers that include the following polymers in either order: tie resin/ethylene vinyl alcohol/tie resin/high density polyethylene/tie resin/Nylon 6/tie resin/high density polyethylene.

20. Any of the preceding multilayer coextruded annular films (1) to (6), wherein at least one nanolayer in the repeating unit includes a polyvinyl chloride, at least one nanolayer in the repeating unit includes an ethylene vinyl alcohol, and at least one nanolayer in the repeating unit includes an adhesive tie resin.

21. Any of the preceding multilayer coextruded annular films (1) to (6), wherein at least one nanolayer in the repeating unit includes a polyvinyl chloride, at least one nanolayer in the repeating unit includes a polyamide, and at least one nanolayer in the repeating unit includes an adhesive tie resin.

22. Any of the preceding multilayer coextruded annular films (1) to (6), wherein at least one nanolayer in the repeating unit includes a polyolefin, at least one nanolayer in the repeating unit includes a polyvinyl chloride, and at least one nanolayer in the repeating unit includes an adhesive tie resin.

23. Any of the preceding multilayer coextruded annular films (1) to (6), wherein at least one nanolayer in the repeating unit includes a polyester, at least one nanolayer in the repeating unit includes a polyvinyl chloride, and at least one nanolayer in the repeating unit includes an adhesive tie resin.

24. Any of the preceding multilayer coextruded annular films (1) to (6), wherein at least one nanolayer in the repeating unit includes a polycarbonate, at least one nanolayer in the repeating unit includes a polyvinyl chloride, and at least one nanolayer in the repeating unit includes an adhesive tie resin.

25. Any of the preceding multilayer coextruded annular films (1) to (6), wherein at least one nanolayer in the repeating unit includes a polyketone, at least one nanolayer in the repeating unit includes an ethylene vinyl alcohol, and at least one nanolayer in the repeating unit includes an adhesive tie resin.

26. Any of the preceding multilayer coextruded annular films (1) to (6), wherein at least one nanolayer in the repeating unit includes a polyketone, at least one nanolayer in the repeating unit includes a polyamide, and at least one nanolayer in the repeating unit includes an adhesive tie resin.

27. Any of the preceding multilayer coextruded annular films (1) to (6), wherein at least one nanolayer in the repeating unit includes a polyester, at least one nanolayer in the repeating unit includes a polyketone, and at least one nanolayer in the repeating unit includes an adhesive tie resin.

28. Any of the preceding multilayer coextruded annular films (1) to (6), wherein at least one nanolayer in the repeating unit includes a polyolefin, at least one nanolayer in the repeating unit includes a polyketone, and at least one nanolayer in the repeating unit includes an adhesive tie resin.

29. Any of the preceding multilayer coextruded annular films (1) to (6), wherein at least one nanolayer in the repeating unit includes polyethylene terephthalate, at least one nanolayer in the repeating unit includes a polyketone, and at least one nanolayer in the repeating unit includes an adhesive tie resin.

30. Any of the preceding multilayer coextruded annular films (1) to (6), wherein at least one nanolayer in the repeating unit includes a copolymer of vinyl chloride and methyl acrylate or ethyl acrylate, at least one nanolayer in the repeating unit includes an ethylene vinyl alcohol, and at least one nanolayer in the repeating unit includes an adhesive tie resin.

31. Any of the preceding multilayer coextruded annular films (1) to (6), wherein at least one nanolayer in the repeating unit includes a copolymer of vinyl chloride and methyl acrylate or ethyl acrylate, at least one nanolayer in the repeating unit includes a polyamide, and at least one nanolayer in the repeating unit includes an adhesive tie resin.

32. Any of the preceding multilayer coextruded annular films (1) to (6), wherein at least one nanolayer in the repeating unit includes a polyester, at least one nanolayer in the repeating unit includes a copolymer of vinyl chloride and methyl acrylate or ethyl acrylate, and at least one nanolayer in the repeating unit includes an adhesive tie resin.

33. Any of the preceding multilayer coextruded annular films (1) to (6), wherein at least one nanolayer in the repeating unit includes a polyolefin, at least one nanolayer in the repeating unit includes a copolymer of vinyl chloride and methyl acrylate or ethyl acrylate, and at least one nanolayer in the repeating unit includes an adhesive tie resin.

34. Any of the preceding multilayer coextruded annular films (1) to (6), wherein at least one nanolayer in the repeating unit includes a polycarbonate, at least one nanolayer in the repeating unit includes a copolymer of vinyl chloride and methyl acrylate or ethyl acrylate, and at least one nanolayer in the repeating unit includes an adhesive tie resin.

35. Any of the preceding multilayer coextruded annular films (7) to (34), wherein "x" is at least 8, "y" is at least 4, and "x:" multiplied by "y" is at least 96.

36. Any of the preceding multilayer coextruded annular films (7) to (34), wherein "x" is at least 24, "y" is at least 3, and "x:" multiplied by "y" is at least 96.

37. A multilayer coextruded annular film including a plurality of continuous unbroken and non-overlapping annular nanolayers arranged in sequence;
the plurality of nanolayers including a number "x" of repeating units defining a repeating sequence of nanolayers;
each repeating unit including a number "y" of nanolayers, including at least three nanolayers having polymer compositions that differ from polymer compositions of each other;
wherein "x" is an integer of at least 8, "y" is an integer of at least 4, and "x" multiplied by "y" is at least 96.

38. The multilayer coextruded annular film (37), wherein at least four of the nanolayers in the repeating unit have polymer compositions that differ from each other.

39. The multilayer coextruded annular film of (37) or (38), wherein "x" is an integer of at least 24.

40. A multilayer coextruded annular film including a plurality of continuous unbroken and non-overlapping annular nanolayers arranged in sequence;
the plurality of nanolayer including a number "x" of repeating units defining a repeating sequence of nanolayers;
each repeating unit including a number "y" of nanolayers, including at least three nanolayers having polymer compositions that differ from polymer compositions of each other;
wherein "x" is an integer of at least 24, "y" is an integer of at least 3, and "x" multiplied by "y" is at least 192.

41. The multilayer coextruded annular film of (40), wherein "x" is an integer of at least 64 and "y" is an integer of at least 3.

42. The multilayer coextruded annular film (40) or (41), wherein "x" is an integer of at least 48 and "y" is an integer of at least 4.

43. Any of the preceding multilayer coextruded annular films (1) to (42) where the film has light transmittance of at least about 80%.

44. Any of the preceding multilayer coextruded annular films (1) to (42) where the film has light transmittance of at least about 84%.

45. Any of the preceding multilayer coextruded annular films (1) to (42) where the film has light transmittance of at least about 88%.

46. Any of the preceding multilayer coextruded annular films (1) to (45) where the film is thermoformable.

While the embodiments of the invention described herein are exemplary, various modifications and improvements can be made without departing from the spirit and scope of the invention. The scope of the invention is defined by the appended claims and all changes that fall within the meaning and range of equivalents are intended to be embraced therein.

I Claim:

1. A modular disk coextrusion die, comprising at least first and second cells, each cell including a plurality of thin annular disks arranged in a stacked configuration;
   each of the first and second cells including a first cap disk having a plurality of openings disposed around a perimeter thereof, a first distribution disk, a first transition disk and a first spreader disk;
   the modular disk coextrusion die further including a channel disk having at least one inlet opening, at least two outlet openings per inlet opening, and one or more channels connecting the at least one inlet opening with the at least two outlet openings;
   wherein the thin annular disks are configured so that a first of the outlet openings of the channel disk is in fluid communication with the first distribution disk in the first cell and a second of the outlet openings of the channel disk is in fluid communication with the first distribution disk in the second cell.

2. The modular disk coextrusion die of claim 1, further comprising a third cell;
   the third cell including a first cap disk having a plurality of openings disposed around a perimeter thereof, a first distribution disk, a first transition disk and a first spreader disk;
   the at least one channel disk having at least three of the outlet openings per inlet opening and one or more channels connecting the at least one inlet opening with the at least three outlet openings;
   wherein the thin annular disks are further configured so that a third of the outlet openings of the channel disk is in fluid communication with the first distribution disk in the third cell.

3. The modular disk coextrusion die of claim 2, further comprising: fourth and fifth cells;
   each of the fourth and fifth cells including a first cap disk having a plurality of openings disposed around a perimeter thereof, a first distribution disk, a first transition disk and a first spreader disk;
   the at least one channel disk having at least five of the outlet openings per inlet opening and one or more channels connecting the at least one inlet opening with the at least five outlet openings;
   wherein the thin annular disks are further configured so that a fourth of the outlet openings of the channel disk is in fluid communication with the first distribution disk in the fourth cell and a fifth of the outlet openings of the channel disk is in fluid communication with the first distribution disk in the fifth cell.

4. The modular disk coextrusion die of claim 1, wherein the channel disk has at least two of the inlet openings, and channels connecting each of the inlet openings with at least two of the outlet openings.

5. The modular disk coextrusion die of claim 4, comprising a number of cells that is at least equal to a total number of outlet openings in the channel disk, wherein each of the outlet openings in the channel disk is in fluid communication with the first distribution disk in at least one of the cells.

6. The modular disk coextrusion die of claim 3, wherein the channel disk has at least two of the inlet openings.

7. The modular disk coextrusion die of claim 6, comprising a number of cells that is at least equal to a total number of outlet openings in the channel disk, wherein each of the outlet openings in the channel disk is in fluid communication with the first distribution disk in at least one of the cells.

8. The modular disk coextrusion die of claim 1, wherein the channel disk is positioned at an entrance to the first cell.

9. The modular disk coextrusion die of claim 1, wherein the channel disk is positioned between two of the cells.

10. The modular disk coextrusion die of claim 1, comprising two or more of the channel disks.

11. A modular disk coextrusion die comprising at least first and second cells, each of the first and second cells including a plurality of thin annular disks arranged in a stacked configuration;
   each of the first and second cells including a central routing disk having at least one flow opening, a first sub-cell on a first side of the central routing disk, and a second sub-cell on a second side of the central routing disk;
   each first sub-cell including a first distribution disk, a first transition disk and a first spreader disk;
   each second sub-cell including a second distribution disk, a second transition disk and a second spreader disk;
   each of the first and second distribution disks including a distribution inlet opening, a plurality of outlet openings, and a plurality of channels connecting the distribution inlet opening with the plurality of outlet openings, wherein the distribution inlet opening in the first distribution disk is about 180 degrees opposed to the distribution inlet opening in the second distribution disk;
   the modular disk coextrusion die further including a channel disk having at least one inlet opening, at least two outlet openings per inlet opening, and one or more channels connecting the at least one inlet opening with the at least two outlet openings;
   wherein the thin annular disks are configured so that the two outlet openings of the channel disk are in fluid communication with at least two of the distribution disks in the first and/or second cells.

12. The modular disk coextrusion die of claim 11, further comprising a third cell;
   the third cell including a central routing disk having at least one flow opening, a first sub-cell on a first side of the central routing disk, and a second sub-cell on a second side of the central routing disk;
   the first sub-cell of the third cell including a first distribution disk, a first transition disk and a first spreader disk;
   the second sub-cell of the third cell including a second distribution disk, a second transition disk and a second spreader disk;
   the at least one channel disk having at least three of the outlet openings per inlet opening and one or more channels connecting the at least one inlet opening with the at least three outlet openings;
   wherein the thin annular disks are further configured so that the three outlet openings of the channel disk are in fluid communication with at least three of the distribution disks in the first, second and/or third cells.

13. The modular disk coextrusion die of claim 12, further comprising fourth and fifth cells:
   each of the fourth and fifth cells including a central routing disk having at least one flow opening, a first sub-cell on a first side of the central routing disk, and a second sub-cell on a second side of the central routing disk;
   each first sub-cell including a first distribution disk, a first transition disk and a first spreader disk;
   each second sub-cell including a second distribution disk, a second transition disk and a second spreader disk;
   the at least one channel disk having at least five of the outlet openings per inlet opening and one or more channels connecting the at least one inlet opening with the at least five outlet openings;
   wherein the thin annular disks are further configured so that the five outlet openings of the channel disk are in fluid communication with at least five of the distribution disks in the first, second, third, fourth and/or fifth cells.

14. The modular disk coextrusion die of claim 11, wherein the channel disk has at least two of the inlet openings, and channels connecting each of the inlet openings with at least two of the outlet openings.

15. The modular disk coextrusion die of claim 14, comprising a number of cells that is at least equal to a total number of outlet openings in the channel disk, wherein the outlet openings in the channel disk are in fluid communication with at least an equal number of distribution disks in the cells.

16. The modular disk coextrusion die of claim 12, wherein the channel disk has at least two of the inlet openings.

17. The modular disk coextrusion die of claim 16, comprising a number of cells that is at least equal to a total number of outlet openings in the channel disk, wherein the outlet openings in the channel disk are in fluid communication with at least an equal number of distribution disks in the cells.

18. The modular disk coextrusion die of claim 11, wherein the channel disk is positioned at an entrance to the first cell.

19. The modular disk coextrusion die of claim 11, wherein the channel disk is positioned between two of the cells.

20. The modular disk coextrusion die of claim 11, comprising two or more of the channel disks.

21. A modular disk coextrusion die, comprising at least ten cells, each cell including a plurality of thin annular disks arranged in a stacked configuration;
   each of the at least ten cells including a first cap disk having a plurality of openings disposed around a perimeter thereof, a first distribution disk, a first transition disk and a first spreader disk;
   the modular disk coextrusion die further including a channel disk having at least two inlet openings, at least five outlet openings per inlet opening, and one or more channels connecting each of the at least one inlet openings with the at least five outlet openings per inlet opening;

wherein each the outlet openings in the channel disk are in fluid communication with at least an equal number of distribution disks in the cells.

22. The modular disk coextrusion die of claim 21, comprising two or more of the channel disks.

* * * * *